United States Patent
Wakita et al.

(10) Patent No.: US 10,756,376 B2
(45) Date of Patent: Aug. 25, 2020

(54) HYDROGEN SUPPLY SYSTEM AND DRIVING METHOD OF HYDROGEN SUPPLY SYSTEM

(71) Applicant: Panasonic Intellectual Property Management Co., Ltd., Osaka (JP)

(72) Inventors: Hidenobu Wakita, Kyoto (JP); Kunihiro Ukai, Nara (JP); Osamu Sakai, Osaka (JP); Yoichiro Tsuji, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 17 days.

(21) Appl. No.: 16/377,888

(22) Filed: Apr. 8, 2019

(65) Prior Publication Data
US 2019/0363386 A1 Nov. 28, 2019

(30) Foreign Application Priority Data
May 24, 2018 (JP) ................................ 2018-099665

(51) Int. Cl.
*H01M 8/04* (2016.01)
*H01M 8/18* (2006.01)
*H01M 8/04746* (2016.01)

(52) U.S. Cl.
CPC ....... *H01M 8/184* (2013.01); *H01M 8/04753* (2013.01)

(58) Field of Classification Search
CPC ...................................... H01M 8/04
See application file for complete search history.

(56) References Cited

U.S. PATENT DOCUMENTS

2004/0253494 A1* 12/2004 Maruyama ........ H01M 8/04089
429/418
2007/0246363 A1 10/2007 Eisman et al.

FOREIGN PATENT DOCUMENTS

| DE | 102015226447 A1 | 6/2017 |
| JP | 2012-111981 | 6/2012 |
| JP | 2015-117139 | 6/2015 |

OTHER PUBLICATIONS

The Extended European Search Report dated Oct. 16, 2019 for the related European Patent Application No. 19166168.5.

* cited by examiner

*Primary Examiner* — Jacob B Marks
(74) *Attorney, Agent, or Firm* — McDermott Will & Emery LLP

(57) ABSTRACT

A hydrogen supply system includes: an electrochemical hydrogen pump including an electrolyte membrane, an anode and a cathode provided to a first and second main surfaces of the electrolyte membrane, respectively, an anode flow path and cathode flow path through which hydrogen flows, and a voltage applicator applying a voltage between the anode and cathode, pressurizing and sending hydrogen supplied to the anode via the anode flow path to the cathode by applying a voltage by the voltage applicator, and supplying the pressurized hydrogen in the cathode flow path to a hydrogen reservoir; a pressure adjuster adjusting a cathode flow path pressure; and a controller controlling the pressure adjuster and making the cathode flow path pressure higher than an anode flow path pressure before starting a hydrogen pressurization action for pressurizing and supplying hydrogen supplied to the anode flow path to the cathode flow path.

16 Claims, 7 Drawing Sheets

HYDROGEN SUPPLY SYSTEM AND DRIVING METHOD OF HYDROGEN SUPPLY SYSTEM

BACKGROUND

1. Technical Field

The present disclosure relates to a hydrogen supply system and a driving method of a hydrogen supply system.

2. Description of the Related Art

In recent years, in view of a fuel efficiency improvement and use of carbon-free fuel, fuel-cell vehicles have been attracting attention which travel while driving a motor by power generated by a fuel cell, and sale thereof has been started.

However, in popularization of fuel-cell vehicles, there have been the problems of how infrastructures for supplying hydrogen gas as fuel may be built and how more hydrogen stations may extensively be placed nation-wide. So far, in the hydrogen stations, methods such as purifying and compressing hydrogen by pressure swing adsorption (PSA) have been performed. However, size increases, huge placement costs, and so forth have been obstacles to nation-wide deployment of hydrogen stations.

In a coming hydrogen-based society, it is desired to develop techniques in which in addition to production of hydrogen, hydrogen may be stored at high density and transported or used by a small capacity and at low cost. Particularly, fuel supply infrastructures have to be built for promotion of popularization of the fuel cells as distributed energy sources.

Further, in order to stably supply hydrogen to the fuel supply infrastructures, various suggestions for purification and pressurization of high purity hydrogen gas have been made.

For example, Japanese Unexamined Patent Application Publication No. 2015-117139 discloses that a voltage is applied between an anode and a cathode of a hydrogen purification pressurization system and purification and pressurization of hydrogen gas may thereby be performed. Specifically, when an electrical current flows through an electrolyte membrane interposed between the anode and the cathode, hydrogen at the anode becomes a proton, and the proton moves from the anode to the cathode through the electrolyte membrane while accompanying a water molecule and is returned to hydrogen at the cathode. Note that a laminated structure of an anode, electrolyte membrane, and a cathode will hereinafter be referred to as membrane electrode assembly (MEA). Further, Japanese Unexamined Patent Application Publication No. 2015-117139 discloses that gases that remain in the hydrogen purification pressurization system when the hydrogen purification pressurization system is stopped are purged with nitrogen.

Japanese Patent No. 5455874 suggests a hydrogen production system in which a voltage is applied between an anode and a cathode of an MEA which includes an electrolyte membrane of a solid polymer type, water supplied to the anode side is electrolyzed, oxygen is thereby produced on the anode side, and hydrogen is thereby produced on the cathode side. Japanese Patent No. 5455874 also discloses that in this hydrogen production system, gas in the cathode side system is discharged to the outside of the system in a case where power supply is stopped and the stopping time reaches a prescribed value.

SUMMARY

However, in related art, discussion has not been made about a case where a pressure of an electrochemical hydrogen pump is adjusted before a hydrogen pressurization action is started in the electrochemical hydrogen pump.

One non-limiting and exemplary embodiment provides a hydrogen supply system that adjusts a pressure of an electrochemical hydrogen pump before a hydrogen pressurization action is started in the electrochemical hydrogen pump and may thereby appropriately maintain efficiency of the hydrogen pressurization action of the electrochemical hydrogen pump compared to related art.

In one general aspect, the techniques disclosed here feature a hydrogen supply system including: an electrochemical hydrogen pump that includes an electrolyte membrane, an anode which is provided to a first main surface of the electrolyte membrane, an anode flow path which is provided on the anode and through which hydrogen flows, a cathode which is provided to a second main surface of the electrolyte membrane, a cathode flow path which is provided on the cathode and through which hydrogen flows, and a voltage applicator which applies a voltage between the anode and the cathode, pressurizes and sends hydrogen which is supplied to the anode via the anode flow path to the cathode by applying a voltage by the voltage applicator, and supplies the pressurized hydrogen in the cathode flow path to a hydrogen reservoir; a pressure adjuster that adjusts a pressure of the cathode flow path; and a controller that controls the pressure adjuster and makes the pressure of the cathode flow path higher than a pressure of the anode flow path before a hydrogen pressurization action, in which hydrogen supplied to the anode flow path is pressurized and supplied to the cathode flow path, is started in order to supply the pressurized hydrogen to the hydrogen reservoir in the electrochemical hydrogen pump.

A hydrogen supply system of one aspect of the present disclosure adjusts a pressure of an electrochemical hydrogen pump before a hydrogen pressurization action is started in the electrochemical hydrogen pump and thereby provides an effect in which an efficiency of the hydrogen pressurization action of the electrochemical hydrogen pump may appropriately be maintained compared to related art.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

It has been desired to use hydrogen energy at high efficiency in related art, and it is important to improve efficiency of a hydrogen pressurization action of an electrochemical hydrogen pump.

Accordingly, intensive studies were carried out about an efficiency improvement in the hydrogen pressurization action of the electrochemical hydrogen pump in view of appropriately adjusting a pump pressure before the hydrogen pressurization action is started in the electrochemical hydrogen pump. The following knowledge was obtained.

Figure 1:
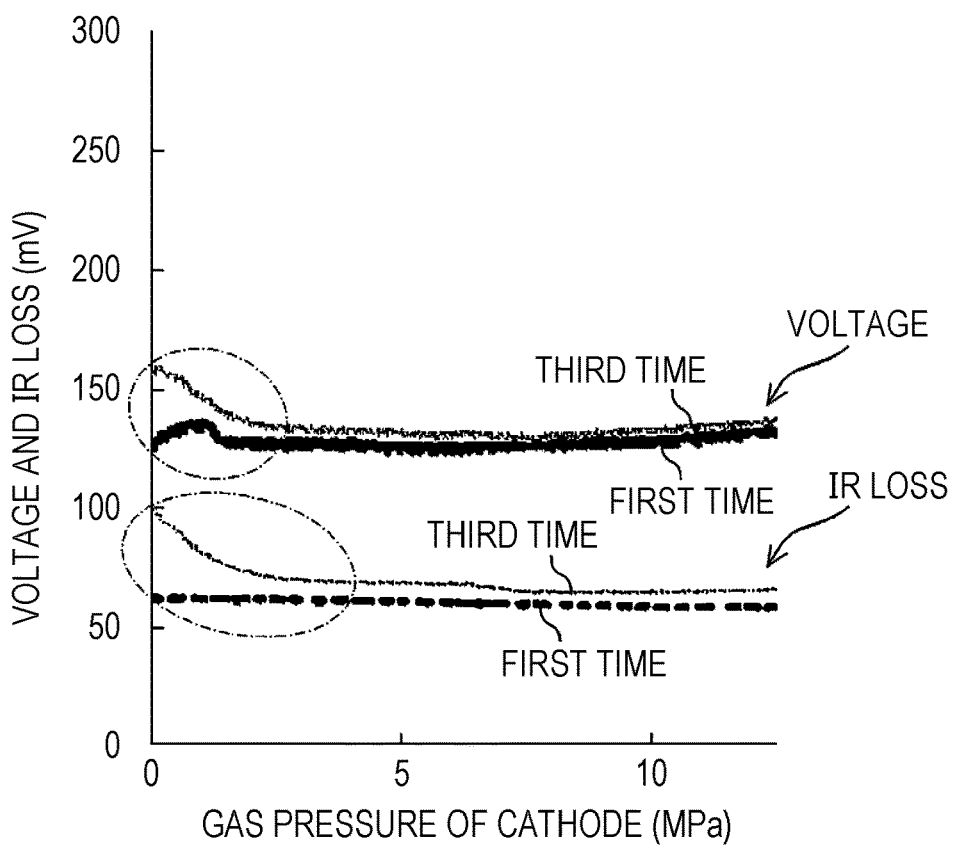
FIG. 1 is a diagram that illustrates one example of experiment results in which the relationships among a gas pressure of a cathode of an MEA, a voltage applied between an anode and the cathode of the MEA, and an IR loss of the MEA are plotted.

FIG. 1 is a diagram that illustrates one example of experiment results in which the relationships among a gas pressure of a cathode of an MEA, a voltage applied between an anode and the cathode of the MEA, and an IR loss of the MEA are plotted.

In the MEA (cell) used in this experiment, a Ti (titanium) powder sintered body whose diameter was approximately 67 mm and which was plated with platinum was used for an anode gas diffusion layer, and a Ti fiber sintered body whose diameter was approximately 67 mm and which was plated with platinum was used for a cathode gas diffusion layer.

This experiment was performed by repeating the hydrogen pressurization action, in which the gas pressure of the cathode of the MEA was pressurized from a normal pressure to a high pressure (here, approximately 13 MPa) at a prescribed temperature (here, 40° C.) of the MEA, plural times. In the hydrogen pressurization action of the MEA, a prescribed voltage was applied between the anode and the cathode of the MEA such that the gas pressure of the anode was fixed to 0.2 MPa and a regular current of 1 A/cm$^2$ in terms of current density flowed between the anode and the cathode of the MEA. Then, the cathode of the MEA was sealed after the hydrogen was supplied to the anode of the MEA, and the gas pressure of the cathode thereby gradually rose from the normal pressure as time elapsed.

Further, the cathode was opened such that the gas pressure of the cathode became the normal pressure before each hydrogen pressurization action of the MEA was started, and fully humidified hydrogen was supplied to the anode of the MEA such that the dew point of hydrogen ($H_2$) supplied to the anode of the MEA became almost equivalent to the temperature of the MEA (that is, such that the relative humidity of hydrogen in the MEA became almost 100%). Then, the MEA was caused to act by causing the current to flow between the anode and the cathode of the MEA.

Subsequently, an exit of the anode of the MEA was sealed, and hydrogen supplied to the anode was thereby switched from gas in a wet state to gas in a dry state. The cathode was sealed, and the hydrogen pressurization action was thereby started.

Note that the above configuration of the MEA and experiment conditions are examples, and configurations and conditions are not limited to those examples.

FIG. 1 indicates the voltages and the IR losses in the first and third hydrogen pressurization actions in the MEA.

As indicated by the one-dot chain line in FIG. 1, it was observed that the voltage and the IR loss in the third hydrogen pressurization action of the MEA rose at a start of the hydrogen pressurization action in the MEA compared to the voltage and the IR loss in the first hydrogen pressurization action of the MEA. Accordingly, it was observed that the efficiency of the third hydrogen pressurization action of the MEA became lower than the efficiency of the first hydrogen pressurization action of the MEA.

Note that although not illustrated, as the frequency of the hydrogen pressurization action of the MEA increased, the rises of the voltage and the IR loss at the start of the hydrogen pressurization action of the MEA became more conspicuous.

Here, the inventors have determined that such rises of the voltage and the IR loss occur because of the following reasons, for example.

When the hydrogen pressurization action of the MEA progresses sufficiently, the gas pressure of the cathode becomes higher than the gas pressure of the anode due to hydrogen pressurization of the cathode. In this case, an electrolyte membrane and an anode catalyst layer of the MEA are pressed by an anode gas diffusion layer due to a differential pressure between the gas pressure of the cathode and the gas pressure of the anode.

On the other hand, the anode and the cathode are often returned to the normal pressure or both of them are often set to the same gas pressure before the hydrogen pressurization action is started in the MEA (that is, when an action of the MEA is stopped). Then, when the next hydrogen pressurization action of the MEA is started (initial stage), as described above, the voltage is applied to the MEA while hydrogen is caused to flow through the anode. Thus, the gas pressure of the anode becomes higher than the gas pressure of the cathode. In this case, the electrolyte membrane and a cathode catalyst layer of the MEA are pressed by a cathode gas diffusion layer due to the differential pressure between the gas pressure of the cathode and the gas pressure of the anode.

That is, reversal occurs between the magnitude relationship between the gas pressure of the anode and the gas pressure of the cathode of the MEA in a case where the hydrogen pressurization action of the MEA starts (the gas pressure of the anode is higher than the gas pressure of the cathode) and the magnitude relationship between the gas pressure of the anode and the gas pressure of the cathode in a case where the hydrogen pressurization action of the MEA progresses sufficiently (the gas pressure of the anode is lower than the gas pressure of the cathode).

Further, the rises of the voltage and the IR loss of the MEA in the initial stage in FIG. 1 are considered to be closely related to such a reversal phenomenon between the magnitude relationships of the gas pressures.

For example, the anode catalyst layer of the MEA is often a porous layer with a thickness of approximately 10 μm, which is formed with carbon black supporting platinum (Pt) and a perfluorosulfonic acid ionomer.

For example, the perfluorosulfonic acid ionomer of the anode catalyst layer more tends to adhere to the anode gas diffusion layer as the temperature of the MEA increases. Thus, because the gas pressure of the cathode becomes higher than the gas pressure of the anode when the hydrogen pressurization action of the MEA progresses, the electrolyte membrane and the anode catalyst layer of the MEA are pressed to the anode gas diffusion layer, and thereby the anode catalyst layer possibly adheres to the anode gas diffusion layer.

Here, the anode gas diffusion layer is often configured with a porous powder sintered body or non-woven fabric, a thin metal steel plate that includes fine openings, or the like. Thus, because the electrolyte membrane and the anode catalyst layer of the MEA are deformed to block those openings when the hydrogen pressurization action of the MEA progresses, the electrolyte membrane and the anode catalyst layer of the MEA tend to adhere to the anode gas diffusion layer in a state where compressive force and tension are partially applied.

Further, hypothetically, in a case where the anode catalyst layer adheres to the anode gas diffusion layer as described above and where the gas pressure of the anode becomes higher than the gas pressure of the cathode when the next hydrogen pressurization action starts, the differential pressure between the two gas pressures is exerted in the direction in which peeling occurs between the anode gas diffusion layer and the anode catalyst layer, between the anode catalyst layer and the electrolyte membrane, and so forth.

Consequently, an adhering portion between the anode gas diffusion layer and the anode catalyst layer and an adhering portion between the anode catalyst layer and the electrolyte membrane may locally be peeled. Further, in a case where a gap occurs due to local peeling in those adhering portions, a contact resistance (electrical resistance) of the MEA increases. Then, the voltage requested for the action of the MEA rises. Further, the IR loss of the MEA rises.

Further, in a case where the gas pressure of the anode is higher than the gas pressure of the cathode, the electrolyte membrane and the cathode catalyst layer of the MEA then possibly adhere to the cathode gas diffusion layer. Further, hypothetically, in a case where the cathode catalyst layer adheres to the cathode gas diffusion layer and where the hydrogen pressurization action of the MEA progresses, the hydrogen pressurization action of the cathode may cause local peeling of an adhering portion between the cathode gas diffusion layer and the cathode catalyst layer and an adhering portion between the cathode catalyst layer and the electrolyte membrane. Further, a gap possibly occurs due to local peeling in those adhering portions.

That is, rising tendencies of the voltage and the IR loss of the MEA in FIG. 1 are considered as a phenomenon that becomes more apparent as the frequency of the hydrogen pressurization action of the MEA increases.

Further, even in a case where the gap occurs due to local peeling in the adhering portions, the gas pressure of the cathode becomes sufficiently higher than the gas pressure of the anode as the hydrogen pressurization action of the MEA progresses. Thus, the above gap is considered to disappear by the gas pressure of the cathode.

That is, as illustrated in FIG. 1, the rising tendencies of the voltage and the IR loss of the MEA are considered as a phenomenon that becomes more conspicuous when the hydrogen pressurization action of the MEA is started.

However, an increase in the contact resistance (electrical resistance) of the MEA due to the above-described peeling in the adhering portions is an example, and such an increase is not limited to this example.

For example, in a case where the gas pressure of the anode becomes higher than the gas pressure of the cathode when the hydrogen pressurization action of the MEA starts and the electrolyte membrane is thereby curved in a protruding shape against the anode gas diffusion layer, a gap possibly occurs between the anode catalyst layer and the anode gas diffusion layer. Then, the contact resistance (electrical resistance) of the MEA may increase. In this case also, as illustrated in FIG. 1, the rising tendencies of the voltage and the IR loss of the MEA are likely to appear when the hydrogen pressurization action of the MEA is started.

In other words, the inventors found that the rises of the voltage and the IR loss of the MEA at a start of the hydrogen pressurization action in the MEA were closely related to the reversal phenomenon between the magnitude relationships between the gas pressure of the anode and the gas pressure of the cathode and conceived one aspect of the present disclosure in the following.

A hydrogen supply system of a first aspect of the present disclosure includes: an electrochemical hydrogen pump that includes an electrolyte membrane, an anode which is provided to a first main surface of the electrolyte membrane, an anode flow path which is provided on the anode and through which hydrogen flows, a cathode which is provided to a second main surface of the electrolyte membrane, a cathode flow path which is provided on the cathode and through which hydrogen flows, and a voltage applicator which applies a voltage between the anode and the cathode, pressurizes and sends hydrogen which is supplied to the anode via the anode flow path to the cathode by applying a voltage by the voltage applicator, and supplies the pressurized hydrogen in the cathode flow path to a hydrogen reservoir; a pressure adjuster that adjusts a pressure of the cathode flow path; and a controller that controls the pressure adjuster and makes the pressure of the cathode flow path higher than a pressure of the anode flow path before a hydrogen pressurization action, in which hydrogen supplied to the anode flow path is pressurized and supplied to the cathode flow path, is started in order to supply the pressurized hydrogen to the hydrogen reservoir in the electrochemical hydrogen pump.

Further, a driving method of a hydrogen supply system, the driving method of a fifteenth aspect of the present disclosure includes: applying a voltage between an anode and a cathode to pressurize and send hydrogen which is supplied to the anode via an anode flow path to the cathode in an electrochemical hydrogen pump that includes an electrolyte membrane, the anode which is provided to a first main surface of the electrolyte membrane, the anode flow path which is provided on the anode and through which hydrogen flows, the cathode which is provided to a second main surface of the electrolyte membrane, and a cathode flow path which is provided on the cathode and through which hydrogen flows; supplying the pressurized hydrogen in the cathode flow path to a hydrogen reservoir; and making a pressure of the cathode flow path higher than a pressure of the anode flow path before execution of the applying of the voltage.

Further, a hydrogen supply system of a sixteenth aspect of the present disclosure includes: an electrolyte membrane; an anode that is provided to a first main surface of the electrolyte membrane; an anode flow path which is provided on the anode and through which hydrogen flows; a cathode that is provided to a second main surface of the electrolyte membrane; a cathode flow path which is provided on the cathode and through which hydrogen flows; a voltage applicator that applies a voltage between the anode and the cathode; and a controller that controls the voltage applicator and makes a pressure of the cathode flow path higher than a pressure of the anode flow path before hydrogen supply to the anode flow path is started.

Further, as for the hydrogen supply system of a second aspect of the present disclosure, in the hydrogen supply system of the first aspect, the controller may control the pressure adjuster and cause the pressure of the cathode flow path to rise before the hydrogen pressurization action is started.

Consequently, the hydrogen supply system and the driving method of a hydrogen supply system of those aspects adjust the pressure of the electrochemical hydrogen pump before the hydrogen pressurization action is started in the electrochemical hydrogen pump and may thereby appropriately maintain the efficiency of the hydrogen pressurization action of the electrochemical hydrogen pump compared to related art. Specifically, the pressure of the cathode flow path becomes higher than the pressure of the anode flow path before the hydrogen pressurization action is started in the electrochemical hydrogen pump. Thus, a state where the electrolyte membrane and the anode catalyst layer are pressed to the anode gas diffusion layer may be retained at a start of the hydrogen pressurization action of the electrochemical hydrogen pump.

This enables lessening in local peeling in the adhering portion between the anode gas diffusion layer and the anode catalyst layer and in the adhering portion between the anode catalyst layer and the electrolyte membrane at a start of the hydrogen pressurization action of the electrochemical hydrogen pump. Further, for example, this also enables mitigation of curving of the electrolyte membrane in a protruding shape against the anode gas diffusion layer at a start of the hydrogen pressurization action of the electrochemical hydrogen pump. Thus, the hydrogen supply system and the driving method of a hydrogen supply system of those aspects may inhibit an increase in the contact resistance (electrical resistance) of the electrochemical hydrogen pump compared to related art and may thus maintain high efficiency of the hydrogen pressurization action of the electrochemical hydrogen pump.

As for the hydrogen supply system of a third aspect of the present disclosure, in the hydrogen supply system of the second aspect, the pressure adjuster may include a first valve that is provided in a first route which connects a pressure supplier which supplies a pressure to the cathode flow path with the cathode flow path, and the controller may cause the pressure of the cathode flow path to rise by opening the first valve before the hydrogen pressurization action is started.

In such a configuration, the hydrogen supply system of this aspect opens the first valve provided in the first route before the hydrogen pressurization action is started in the electrochemical hydrogen pump and may thereby provide the pressure in the pressure supplier to the cathode flow path. Accordingly, the state where the electrolyte membrane and the anode catalyst layer are pressed to the anode gas diffusion layer may be retained at a start of the hydrogen pressurization action of the electrochemical hydrogen pump. Thus, an increase in the contact resistance (electrical resistance) of the electrochemical hydrogen pump may be inhibited.

Further, as for the hydrogen supply system of a fourth aspect of the present disclosure, in the hydrogen supply system of the third aspect, the pressure supplier may include a gas reservoir.

In such a configuration, the hydrogen supply system of this aspect opens the first valve provided in the first route before the hydrogen pressurization action is started in the electrochemical hydrogen pump and may thereby provide a gas pressure in the gas reservoir to the cathode flow path.

Incidentally, for realization of a hydrogen-based society in the future, a method has been suggested which generates hydrogen by using renewable energy. For example, it is possible to generate hydrogen by a water electrolysis device by using power generated by a solar photovoltaic device in the daytime or to generate hydrogen by applying sunlight to a photocatalyst. In this case, hydrogen generated by using renewable energy may be stored in the hydrogen reservoir by the hydrogen pressurization action of the electrochemical hydrogen pump, for example. That is, in the daytime, renewable energy such as sunlight is stored in the hydrogen reservoir in a mode of hydrogen accumulation, instead of electricity accumulation in an accumulator battery or together with electricity accumulation. Then, in the night time, power generation is performed by a fuel cell, for example, by using hydrogen stored in the hydrogen reservoir.

In such a manner, construction of a hydrogen system that may reduce dependence on grid power has been discussed.

Here, the inventors have found that in view of construction of such a hydrogen system, using the hydrogen reservoir as a gas reservoir that supplies the gas pressure to the cathode flow path of the electrochemical hydrogen pump is rational. For example, after hydrogen is stored in the hydrogen reservoir by the hydrogen pressurization action of the electrochemical hydrogen pump, it is requested to close a valve that is provided in a route which connects the hydrogen reservoir with the cathode flow path. That is, while the hydrogen pressurization action of the electrochemical hydrogen pump is stopped, it is requested to disconnect the communication between the hydrogen reservoir and the cathode of the electrochemical hydrogen pump. This is because cross leakage of hydrogen gradually occurs from the cathode in a high pressure state to the anode in a low pressure state through the electrolyte membrane and the pressure of the cathode thereby lowers.

Accordingly, as for the hydrogen supply system of a fifth aspect of the present disclosure, in the hydrogen supply system of the fourth aspect, the gas reservoir may include a hydrogen reservoir.

In such a configuration, the hydrogen supply system of this aspect opens the first valve provided in the first route before the hydrogen pressurization action is started in the electrochemical hydrogen pump and may thereby provide a hydrogen gas pressure in the hydrogen reservoir to the cathode flow path.

As for the hydrogen supply system of a sixth aspect of the present disclosure, in the hydrogen supply system of the second aspect, the pressure adjuster includes a first valve that is provided in a first route which connects a pressure supplier which supplies a pressure to the cathode flow path with the cathode flow path, and the controller causes the pressure of the cathode flow path to rise by opening the first valve and causing the pressure supplier to act before the hydrogen pressurization action is started.

In such a configuration, the hydrogen supply system of this aspect may provide the pressure, which is produced by causing the pressure supplier to act, to the cathode flow path before the hydrogen pressurization action is started in the electrochemical hydrogen pump. Accordingly, the state where the electrolyte membrane and the anode catalyst layer are pressed to the anode gas diffusion layer may be retained at a start of the hydrogen pressurization action of the electrochemical hydrogen pump. Thus, an increase in the contact resistance (electrical resistance) of the electrochemical hydrogen pump may be inhibited.

As for the hydrogen supply system of a seventh aspect of the present disclosure, in the hydrogen supply system of the sixth aspect, the pressure supplier may include a fluid supplier that supplies a fluid to the cathode flow path.

In such a configuration, the hydrogen supply system of this aspect may provide a fluid pressure, which is produced when the fluid is supplied to the cathode flow path by an action of the fluid supplier, to the cathode flow path before the hydrogen pressurization action is started in the electrochemical hydrogen pump.

In the hydrogen supply system of the seventh aspect, the hydrogen supply system of an eighth aspect of the present disclosure may further include: a second route through which a fluid discharged from the cathode flow path flows; and a second valve that is provided in the second route, in which the controller may open the second valve in a case where the controller causes the pressure of the cathode flow path to rise by opening the first valve and causing the fluid supplier to act before the hydrogen pressurization action is started.

In such a configuration, the hydrogen supply system of this aspect may provide a fluid pressure, which is produced when the fluid passes through the inside of the cathode by the action of the fluid supplier, to the cathode flow path before the hydrogen pressurization action is started in the electrochemical hydrogen pump.

As for the hydrogen supply system of a ninth aspect of the present disclosure, in the hydrogen supply system of the eighth aspect, the second route may be connected with the anode flow path. Further, as for the hydrogen supply system of a tenth aspect of the present disclosure, in the hydrogen supply system of the ninth aspect, a pressure dropper may be provided in the second route.

In such a configuration, a differential pressure, which is produced in the pressure dropper when the fluid discharged from the cathode flow path is supplied to the anode flow path via the second route, is used, and the pressure of the cathode flow path may thereby be made higher than the pressure of the anode flow path. Thus, the hydrogen supply system of this aspect may retain the state where the electrolyte membrane and the anode catalyst layer are pressed to the anode gas diffusion layer by the differential pressure at a start of the hydrogen pressurization action of the electrochemical hydrogen pump and may thus inhibit an increase in the contact resistance (electrical resistance) of the electrochemical hydrogen pump.

As for the hydrogen supply system of an eleventh aspect of the present disclosure, in the hydrogen supply system of the seventh to the tenth aspects, the fluid supplier may include a gas supplier.

In such a configuration, the hydrogen supply system of this aspect may provide a gas pressure, which is produced when gas is supplied to the cathode flow path by an action of the gas supplier, to the cathode flow path before the hydrogen pressurization action is started in the electrochemical hydrogen pump.

As for the hydrogen supply system of a twelfth aspect of the present disclosure, in the hydrogen supply system of the seventh to the tenth aspects, the fluid supplier may include a water supplier.

In such a configuration, the hydrogen supply system of this aspect may provide a water pressure, which is produced when water is supplied to the cathode flow path by an action of the water supplier, to the cathode flow path before the hydrogen pressurization action is started in the electrochemical hydrogen pump.

Further, in a case where the electrolyte membrane is a polymer electrolyte membrane, for example, the polymer electrolyte membrane exhibits proton conductivity in a wet state. Thus, in this case, the hydrogen supply system of this aspect supplies water to the cathode flow path and may thereby appropriately maintain the polymer electrolyte membrane in a wet state before the hydrogen pressurization action is started in the electrochemical hydrogen pump.

As for the hydrogen supply system of a thirteenth aspect of the present disclosure, in the hydrogen supply system of the first aspect, the controller may control the pressure adjuster and maintain the pressure of the cathode flow path at a higher pressure than the anode flow path in a case where the hydrogen pressurization action is not performed.

When the hydrogen pressurization action is not performed in the electrochemical hydrogen pump, cross leakage of hydrogen gradually occurs from the cathode in a high pressure state to the anode in a low pressure state through the electrolyte membrane, and the pressure of the cathode flow path thereby lowers. Further, when such a state continues for a prescribed period, the pressure of the cathode flow path possibly becomes almost equivalent to the pressure of the anode flow path due to cross leakage of hydrogen before the hydrogen pressurization action is started in the electrochemical hydrogen pump. Then, when hydrogen is supplied to the anode at a start of the hydrogen pressurization action of the electrochemical hydrogen pump, the pressure of the anode flow path possibly becomes higher than the pressure of the cathode flow path.

However, the hydrogen supply system of this aspect controls the pressure adjuster, thereby maintains the pressure of the cathode flow path at a higher pressure than the anode flow path when the hydrogen pressurization action is not performed in the electrochemical hydrogen pump, and may thereby reduce such a possibility.

As for the hydrogen supply system of a fourteenth aspect of the present disclosure, in the hydrogen supply system of the first aspect, the voltage applicator may also serve as the pressure adjuster, and the controller may cause the voltage applicator to apply a voltage between the anode and the cathode and make a pressure of the cathode higher than a pressure of the anode before the hydrogen pressurization action for supplying the pressurized hydrogen to the hydrogen reservoir is started.

In such a configuration, the hydrogen supply system of this aspect causes the voltage applicator to apply a voltage between the anode and the cathode and may thereby easily maintain the pressure of the cathode at a higher pressure than the pressure of the anode before the hydrogen pressurization action is started in the electrochemical hydrogen pump. Thus, when the hydrogen pressurization action of the electrochemical hydrogen pump is started, the hydrogen supply system of this aspect may easily reduce the possibility that the pressure of the anode flow path becomes higher than the pressure of the cathode flow path due to cross leakage of hydrogen when hydrogen is supplied to the anode flow path.

Embodiments of the present disclosure will hereinafter be described with reference to the attached drawings. Each of the embodiments described in the following represents one example of each of the above aspects. Thus, shapes, materials, configuration elements, arrangement positions and connection manners of configuration elements, and so forth that are described in the following do not limit any of the above aspects unless those are described in claims. Further, the configuration elements that are not described in the independent claims which provide the most superordinate concepts of the aspects among the configuration elements in the following will be described as arbitrary configuration elements. Further, the configuration elements to which the same reference characters are given in the drawings may not be described. Further, the drawings schematically illustrate the configuration elements for easy understanding. Shapes, dimension ratios, and so forth may not accurately be depicted.

First Embodiment

[Device Configuration]

Figure 2:
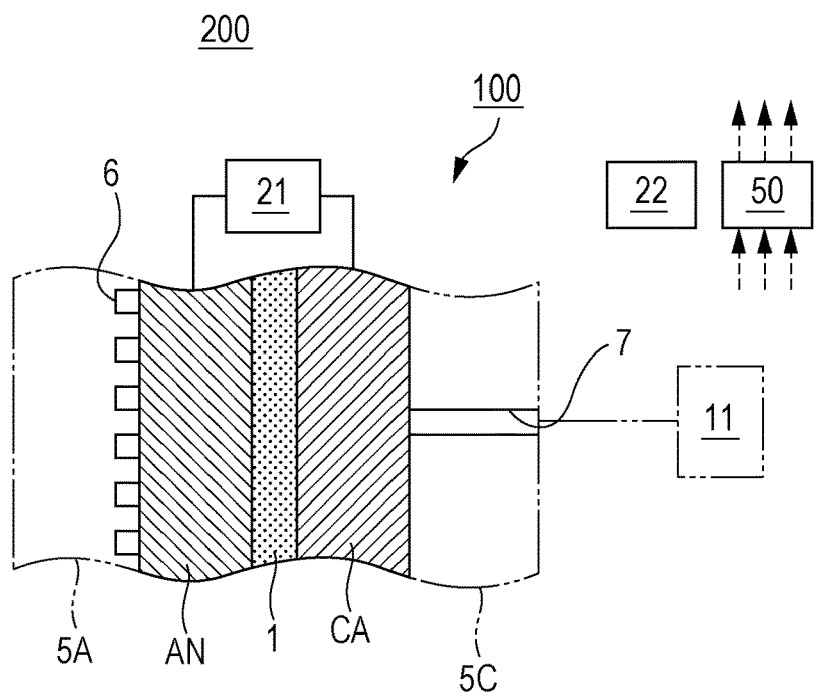
FIG. 2 is a diagram that illustrates one example of a hydrogen supply system of a first embodiment.

FIG. 2 is a diagram that illustrates one example of a hydrogen supply system of a first embodiment.

In the example illustrated in FIG. 2, a hydrogen supply system 200 includes an electrochemical hydrogen pump 100, a pressure adjuster 22, and a controller 50. Note that a hydrogen storage apparatus 11 indicated by two-dot chain lines in FIG. 2 may be provided together with the hydrogen supply system 200.

Here, the electrochemical hydrogen pump 100 includes an electrolyte membrane 1, an anode AN, a cathode CA, and a voltage applicator 21.

Note that as indicated by two-dot chain lines in FIG. 2, the electrochemical hydrogen pump 100 is often provided with an anode separator 5A (see FIG. 3A) that forms an anode flow path 6 of the electrochemical hydrogen pump 100 and a cathode separator 5C (see FIG. 3A) that forms a cathode flow path 7.

The electrolyte membrane 1 is a membrane that includes a pair of main surfaces and has proton (H$^+$) conductivity. The electrolyte membrane 1 may have any configuration as long as it is such a membrane having proton conductivity. For example, as the electrolyte membrane 1, a fluorine-based polymer electrolyte membrane, a hydrocarbon-based electrolyte membrane, and so forth may be raised. Specifically, for example, as the electrolyte membrane 1, Nafion® (E. I. du Pont de Nemours and Company), Aciplex® (Asahi Kasei Corporation), or the like may be used. However, the electrolyte membrane 1 is not limited to those.

The anode AN is provided on one main surface of the electrolyte membrane 1. The anode AN includes an anode catalyst layer and an anode gas diffusion layer, but details of the anode catalyst layer and the anode gas diffusion layer will be described later.

The cathode CA is provided on the other main surface of the electrolyte membrane 1. The cathode CA includes a cathode catalyst layer and a cathode gas diffusion layer, but details of the cathode catalyst layer and the cathode gas diffusion layer will be described later.

The anode flow path 6 is a flow path which is provided on the anode AN and through which hydrogen flows. For example, as illustrated in FIG. 2, the anode flow path 6 may be formed on a main surface of the anode separator 5A, with which the anode AN contacts, in a serpentine-like manner. Accordingly, hydrogen (H$_2$) is supplied to the anode AN via the anode flow path 6.

The cathode flow path 7 is a flow path which is provided on the cathode CA and through which hydrogen flows. For example, as illustrated in FIG. 2, the cathode flow path 7 may be formed to pass through the cathode separator 5C such that the cathode flow path 7 communicates with the outside from an appropriate place on the cathode CA. Accordingly, hydrogen (H$_2$) in the cathode CA in a high pressure state is supplied to the hydrogen storage apparatus 11 on the outside, for example.

The voltage applicator 21 is a device that applies a voltage between the anode AN and the cathode CA.

The voltage applicator 21 may have any configuration as long as it may apply a voltage between the anode AN and the cathode CA. Specifically, a high electrical potential side terminal of the voltage applicator 21 is connected with the anode AN, and a low electrical potential side terminal of the voltage applicator 21 is connected with the cathode CA. Accordingly, energization is performed between the anode AN and the cathode CA by using the voltage applicator 21.

As the voltage applicator 21, for example, a DC/DC converter, an AC/DC converter, and so forth may be raised. The DC/DC converter is used in a case where the voltage applicator 21 is connected with a direct current power source such as a battery, and the AC/DC converter is used in a case where the voltage applicator 21 is connected with an alternating current power source such as a commercial power source.

The electrochemical hydrogen pump 100 is a device that receives application of voltage by the voltage applicator 21, thereby pressurizes and sends hydrogen supplied to the anode AN via the anode flow path 6 to the cathode CA, and supplies the pressurized hydrogen in the cathode flow path 7 to the hydrogen storage apparatus 11. As the hydrogen storage apparatus 11, for example, a tank may be raised.

Note that a specific example of the above electrochemical hydrogen pump 100 will be described later.

In the hydrogen supply system 200 of this embodiment, hydrogen may be supplied from the hydrogen storage apparatus 11 to a proper hydrogen acceptor after hydrogen is supplied from the electrochemical hydrogen pump 100 to the hydrogen storage apparatus 11. As such a hydrogen acceptor, for example, a fuel cell for household use or for an automobile and so forth may be raised.

The pressure adjuster 22 is a device that adjusts the pressure of the cathode flow path 7. The pressure adjuster 22 may have any configuration as long as it may adjust the pressure of the cathode flow path 7.

Note that specific examples of the pressure adjuster 22 will be described in the other embodiments, practical examples, and a modification example.

The controller 50 controls the pressure adjuster 22 and makes the pressure of the cathode flow path 7 higher than the pressure of the anode flow path 6 before a hydrogen pressurization action, in which hydrogen supplied to the anode flow path 6 is pressurized and supplied to the cathode flow path 7, is started in order to supply pressurized hydrogen to the hydrogen storage apparatus 11 in the electrochemical hydrogen pump 100. Further, for example, the controller 50 may control the pressure adjuster 22 and cause the pressure of the cathode flow path 7 to rise before the hydrogen pressurization action of the electrochemical hydrogen pump 100 is started. Note that the time before the hydrogen pressurization action of the electrochemical hydrogen pump 100 is started may be the time before hydrogen supply to the anode flow path 6 is started.

The controller 50 may have any configuration as long as it has a control function. The controller 50, for example, includes an arithmetic circuit (not illustrated) and a storage circuit (not illustrated) that stores a control program. As the arithmetic circuit, for example, an MPU, a CPU, and so forth may be raised. As the storage circuit, for example, a memory and so forth may be raised. The controller 50 may be configured with a single controller that performs centralized control or may be configured with plural controllers that mutually and cooperatively perform distributed control.

[Specific Example of Electrochemical Hydrogen Pump]

Figure 3A:
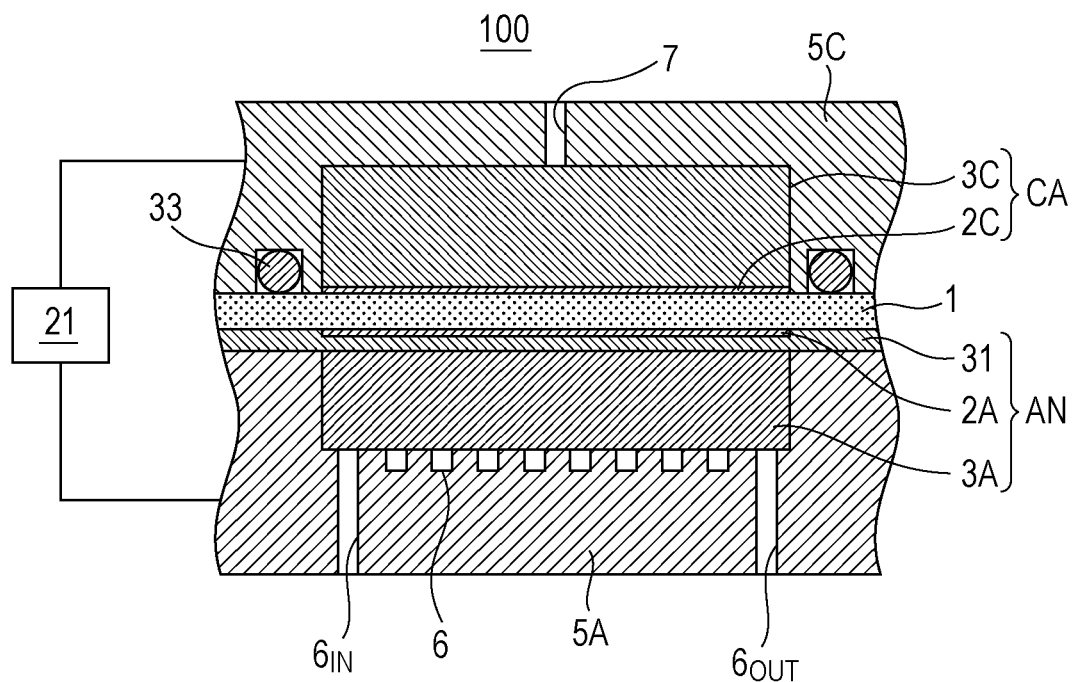
FIG. 3A is a diagram that illustrates one example of an electrochemical hydrogen pump of the hydrogen supply system of the first embodiment.
Figure 3B:
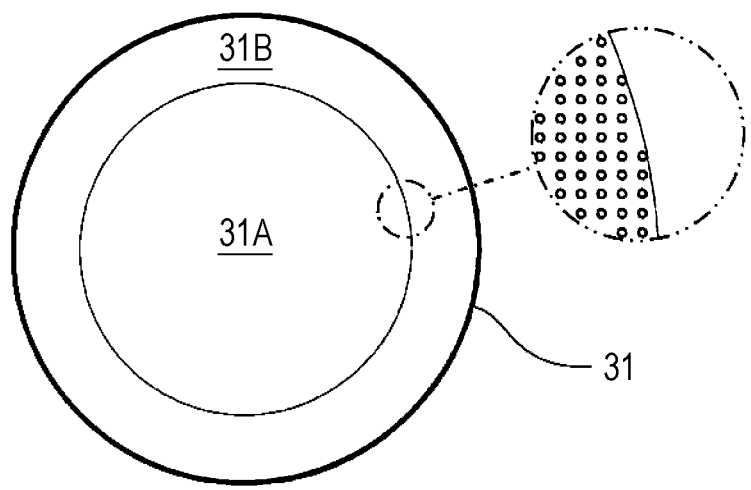
FIG. 3B is a diagram that illustrates one example of the electrochemical hydrogen pump of the hydrogen supply system of the first embodiment.

FIG. 3A and FIG. 3B are diagrams that illustrate one example of the electrochemical hydrogen pump of the hydrogen supply system of the first embodiment. Note that FIG. 3B illustrates a diagram in which an anode gas diffusion plate 31 of the electrochemical hydrogen pump 100 is seen in a plan view.

In the example illustrated in FIG. 3A, the electrochemical hydrogen pump 100 includes the electrolyte membrane 1, the anode AN, the cathode CA, the anode separator 5A, the cathode separator 5C, the voltage applicator 21, and a sealing member 33.

Note that the electrolyte membrane 1 is similar to the electrochemical hydrogen pump 100 in FIG. 1, and a description thereof will thus not be made. Further, the configuration of the voltage applicator 21 is similar to the above, and a detailed description thereof will thus not be made.

Here, as illustrated in FIG. 3A, the anode AN (electrode) is configured with the anode gas diffusion plate 31, an anode catalyst layer 2A, and an anode gas diffusion layer 3A. The cathode CA (electrode) is configured with a cathode catalyst layer 2C and a cathode gas diffusion layer 3C.

The anode catalyst layer 2A is provided on one main surface of the electrolyte membrane 1. The anode catalyst layer 2A may include platinum (Pt) or the like as catalyst metal, for example, but embodiments are not limited to this. Note that although not illustrated, in a plan view, a sealing member is provided so as to surround the anode catalyst layer 2A, and hydrogen gas of the anode AN is appropriately sealed by this sealing member.

The cathode catalyst layer 2C is provided on the other main surface of the electrolyte membrane 1. The cathode catalyst layer 2C may include Pt or the like as catalyst metal, for example, but embodiments are not limited to this. In a plan view, the sealing member 33 is provided so as to surround the cathode catalyst layer 2C, and hydrogen gas of the cathode CA is appropriately sealed by the sealing member 33.

Because various methods may be raised as catalyst adjustment methods for the cathode catalyst layer 2C and the anode catalyst layer 2A, adjustment methods are not particularly limited. For example, as supports of the catalysts, electrically-conductive oxide powder, carbon-based powder, and so forth may be raised. As the carbon-based powder, for example, powder of graphite, carbon black, electrically conductive activated carbon, and so forth may be raised. A method for supporting platinum or other catalyst metal on the support such as carbon is not particularly limited. For example, a method such as powder mixing or liquid-phase mixing may be used. As the latter liquid-phase mixing, for example, a method, in which the support such as carbon is dispersed in a catalyst component colloid liquid and adsorption is performed, or the like may be raised. Further, using an active oxygen removing agent as the support in accordance with request, platinum or other catalyst metal may be supported by a method similar to the above method. A supported state of the catalyst metal such as platinum on the support is not particularly limited. For example, the catalyst metal may be atomized and supported on the support in a highly dispersed state.

The anode gas diffusion layer 3A is configured with a porous body or the like and has corrosion resistance, electrical conductivity, and gas diffusibility, for example. Further, the anode gas diffusion layer 3A is desirably configured with a high rigidity material that may inhibit displacement or deformation of configuration members which occurs due to a differential pressure between the anode AN and the cathode CA in the hydrogen pressurization action of the electrochemical hydrogen pump 100.

The anode separator 5A is provided to cover one main surface and side surfaces of the anode gas diffusion layer 3A. Specifically, the anode gas diffusion layer 3A is housed in a recess in a central portion of the anode separator 5A. Further, the serpentine-like anode flow path 6 is formed on the main surface of the anode separator 5A with which the anode gas diffusion layer 3A contacts. Accordingly, when hydrogen gas passes through the anode flow path 6 between an anode entrance $6_{IN}$ and an anode exit $6_{OUT}$, hydrogen gas is supplied to the anode gas diffusion layer 3A.

Note that the anode flow path 6 may be formed by providing a serpentine-like slit hole in a plate member separate from the anode separator 5A and integrally joining both of those or may be formed by processing a serpentine-like flow path groove in the main surface of the anode separator 5A.

The anode separator 5A is configured with a metal member or the like and has corrosion resistance and electrical conductivity, for example. As a material of the anode separator 5A, titanium plated with platinum or the like may be used, for example.

As illustrated in FIG. 3A and FIG. 3B, a circular anode gas diffusion plate 31 may be provided to the electrochemical hydrogen pump 100.

The anode gas diffusion plate 31 includes a circular central portion 31A that contacts with the other main surface of the anode gas diffusion layer 3A and the anode catalyst layer 2A and an annular peripheral portion 31B that contacts with the anode separator 5A and the electrolyte membrane 1.

As illustrated in FIG. 3B, plural vent holes are formed in the central portion 31A of the anode gas diffusion plate 31. Accordingly, hydrogen gas may pass between the anode catalyst layer 2A and the anode gas diffusion layer 3A through the vent holes. The vent holes may be openings of approximately several ten microns that are uniformly provided at intervals of several ten microns, for example. However, the size and interval of the vent hole are not limited to those. Note that such a vent hole may be formed by laser processing or the like, for example.

Meanwhile, the vent holes are not formed in the peripheral portion 31B of the anode gas diffusion plate 31, and the peripheral portion 31B is flat.

The anode gas diffusion plate 31 is configured with a metal plate or the like and has corrosion resistance and electrical conductivity, for example. As the anode gas diffusion plate 31, a titanium plate that is plated with platinum may be used, for example.

The sealing member 33 is provided on the peripheral portion 31B (flat portion) of the anode gas diffusion plate 31 via the electrolyte membrane 1. Thus, the electrolyte membrane 1 is pressed to the peripheral portion 31B of the anode gas diffusion plate 31 by the sealing member 33. Note that the sealing member 33 is formed into an annular shape in a plan view. As the sealing member 33, for example, an O-ring or the like may be used.

The above anode gas diffusion plate 31 and sealing member 33 are examples, and embodiments are not limited to those examples. For example, the anode gas diffusion plate 31 is configured with a circular plate but is not limited to this. In a case where the shape of the anode gas diffusion layer 3A in a plan view is a rectangular shape, for example, the shape of the anode gas diffusion plate 31 in a plan view may be a rectangular shape, or the shape of the sealing member 33 in a plan view may be a rectangular annular shape.

The cathode gas diffusion layer 3C is configured with a porous body or the like and has corrosion resistance, electrical conductivity, and gas diffusibility, for example. For example, the cathode gas diffusion layer 3C is configured with a porous body, which has corrosion resistance and electrical conductivity, such as a titanium fiber sintered body plated with platinum. Further, the cathode gas diffusion layer 3C is desirably configured with an elastic material that is less likely to buckle and may follow displacement or deformation of configuration members which occurs due to the differential pressure between the anode AN and the cathode CA in the hydrogen pressurization action of the electrochemical hydrogen pump 100.

The cathode separator 5C is provided to cover a main surface and side surfaces of the cathode gas diffusion layer 3C. Specifically, the cathode gas diffusion layer 3C is housed in a recess in a central portion of the cathode separator 5C. Further, the cathode flow path 7 for leading hydrogen gas of the cathode gas diffusion layer 3C in a high pressure state to the outside is provided to an appropriate place of the cathode separator 5C. The number of cathode flow path 7 may be one as illustrated in FIG. 3A or may be plural.

The cathode separator 5C is configured with a metal member or the like and has corrosion resistance and electrical conductivity, for example. As a material of the cathode separator 5C, titanium plated with platinum or the like may be used, for example.

Note that the sealing member 33 is provided to the cathode separator 5C. Specifically, the cathode gas diffusion layer 3C is housed in the recess in the central portion of the cathode separator 5C, and an outer periphery portion of the cathode separator 5C contacts with the electrolyte membrane 1. Further, an annular groove is formed in an appropriate place of the outer periphery portion, and the sealing member 33 is fitted in the annular groove.

Note that the shape of the cathode separator 5C may be a cylindrical body with a bottom or may be a rectangular tubular body with a bottom. However, the cathode separator 5C is configured with a cylindrical body, and resistance against the gas pressure of the cathode separator 5C may be improved compared to a case where the cathode separator 5C is configured with a rectangular tubular body.

Here, although not illustrated in FIG. 3A, members and apparatuses that are requested for the hydrogen pressurization action of the electrochemical hydrogen pump 100 of this embodiment are properly provided.

For example, in the electrochemical hydrogen pump 100, approximately 10 to 200 unit cells, each of which is configured with the MEA, the anode separator 5A, and the cathode separator 5C, may be stacked to configure a laminated body, and the laminated body may be interposed between end plates via a current collector plate and an insulating plate, and both of the end plates may be fastened together by a fastening rod or the like. Note that the number of such unit cells may be set to a proper number based on operation conditions of the electrochemical hydrogen pump 100. In this case, in order to avoid leakage of high pressure gas from the electrochemical hydrogen pump 100 to the outside, sealing members such as O-rings or gaskets are provided from both sides of the MEA, and the sealing members may integrally be assembled with the MEA in advance. Further, on the outside of the MEA, the electrically conductive anode separator 5A and cathode separator 5C for mechanically fixing the MEA and electrically connecting the neighboring MEAs with each other in series are arranged.

Further, hydrogen gas may be supplied from an external hydrogen supply source that has a prescribed supply pressure to the electrochemical hydrogen pump 100. As the external hydrogen supply source, for example, a gas storage apparatus (for example, a gas cylinder), a gas supply infrastructure, and so forth may be raised. In this case, hydrogen gas may be generated by a water electrolysis device or the like, for example.

Note that the above various members and apparatuses, which are not illustrated, are examples, and embodiments are not limited to those examples.

[Action]

A driving method (action) of the hydrogen supply system 200 of this embodiment will hereinafter be described with reference to the drawings.

The following action may be performed by a control program from the storage circuit of the controller 50, which is performed by the arithmetic circuit of the controller 50, for example. However, performing the following action by the controller is not necessarily requested. An operator may perform a portion of the action.

First, hydrogen ($H_2$) that flows in through the anode entrance $6_{IN}$ is supplied to the anode AN of the electrochemical hydrogen pump 100 through the anode flow path 6, and power of the voltage applicator 21 is fed to the electrochemical hydrogen pump 100.

Then, in the anode catalyst layer 2A of the anode AN of the electrochemical hydrogen pump 100, a hydrogen molecule is separated into hydrogen ions (protons) and electrons by an oxidation reaction (formula (1)). A proton is conducted through the inside of the electrolyte membrane 1 and moves to the cathode catalyst layer 2C of the cathode CA. An electron moves to the cathode catalyst layer 2C through the voltage applicator 21. Then, in the cathode catalyst layer 2C of the cathode CA, a hydrogen molecule is again generated by a reduction reaction (formula (2)).

In this case, it is known that when protons are conducted through the electrolyte membrane 1, a prescribed amount of water moves from the anode AN to the cathode CA as electro-osmotic water while accompanying protons. A portion of this water is removed from hydrogen that is led out from the cathode flow path 7 of the electrochemical hydrogen pump 100 by a proper water condensation trap (not illustrated) that is maintained at room temperature, for example.

Here, a pressure drop of a gas lead-out route is increased by using a flow amount adjuster (for example, a back pressure valve, an adjusting valve, or the like provided in piping, which is not illustrated) that is provided in the gas lead-out route (not illustrated) through which hydrogen gas led out from the cathode flow path 7 of the electrochemical hydrogen pump 100 flows, and hydrogen gas generated in the cathode may thereby be pressurized. Thus, hydrogen gas in a high pressure state may be stored in the hydrogen storage apparatus 11, for example.

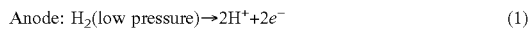

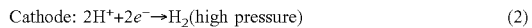

Incidentally, when the hydrogen pressurization action of the electrochemical hydrogen pump 100 progresses, the gas pressure of the cathode CA becomes higher than the gas pressure of the anode AN. Thus, the electrolyte membrane 1 and the anode catalyst layer 2A of the electrochemical hydrogen pump 100 are pressed to the anode gas diffusion plate 31 (the anode gas diffusion layer 3A), and thereby the anode catalyst layer 2A possibly adheres to the anode gas diffusion plate 31.

Hypothetically, in a case where the gas pressure of the anode AN becomes higher than the gas pressure of the cathode CA in a state where the anode catalyst layer 2A adheres to the anode gas diffusion plate 31 when the next hydrogen pressurization action of the electrochemical hydrogen pump 100 starts, the differential pressure between the two gas pressures is exerted in the direction in which peeling occurs between the anode gas diffusion plate 31 and the anode catalyst layer 2A, between the anode catalyst layer 2A and the electrolyte membrane 1, and so forth.

Accordingly, the driving method of the hydrogen supply system 200 of this embodiment includes: applying a voltage between the anode AN and the cathode CA to pressurize and send hydrogen which is supplied to the anode AN via the anode flow path 6 to the cathode CA in the electrochemical hydrogen pump 100, supplying pressurized hydrogen in the cathode flow path 7 to the hydrogen storage apparatus 11, and making a pressure of the cathode flow path 7 higher than a pressure of the anode flow path 6 before execution of the applying of the voltage. Note that a time before execution of the applying of the voltage may be a time before hydrogen supply to the anode flow path 6 is started.

Consequently, in a case where the anode catalyst layer 2A adheres to the anode gas diffusion plate 31, peeling between the anode gas diffusion plate 31 and the anode catalyst layer 2A, peeling between the anode catalyst layer 2A and the electrolyte membrane 1, and so forth may appropriately be inhibited.

Figure 4:
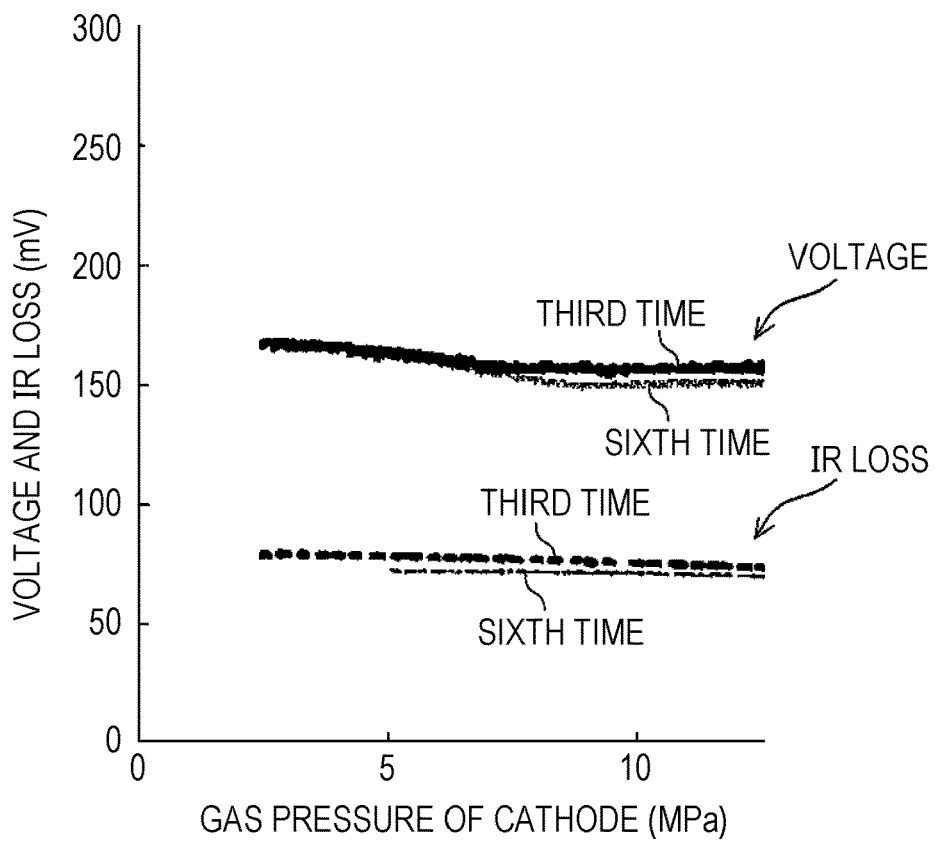
FIG. 4 is a diagram that illustrates one example of experiment results in which the relationships among the gas pressure of the cathode of the MEA, the voltage applied between the anode and the cathode of the MEA, and the IR loss of the MEA are plotted.

FIG. 4 is a diagram that illustrates one example of experiment results in which the relationships among a gas pressure of a cathode of the MEA, a voltage applied between an anode and the cathode of the MEA, and an IR loss of the MEA are plotted.

The configuration of the MEA (cell) used in this experiment was similar to the configuration of the MEA used in the experiment of FIG. 1, and a description thereof will thus not be made.

This experiment was performed by repeating the hydrogen pressurization action, in which the gas pressure of the cathode of the MEA was pressurized from a prescribed initial pressure (here, approximately 2.5 MPa) to a high pressure (here, approximately 13 MPa) at a prescribed temperature (here, 40° C.) of the MEA, plural times.

In the hydrogen pressurization action of the MEA, a prescribed voltage (hereinafter, voltage) was applied between the anode and the cathode of the MEA such that the gas pressure of the anode was fixed to 0.2 MPa and a regular current of 1 A/cm² in terms of current density flowed between the anode and the cathode of the MEA. Then, the cathode of the MEA was sealed after the hydrogen was supplied to the anode of the MEA, and the gas pressure of the cathode thereby gradually rose from the initial pressure as time elapsed.

Further, an operation for setting the gas pressure of the cathode to the initial pressure was performed before each hydrogen pressurization action of the MEA was started, and fully humidified hydrogen was supplied to the anode of the MEA such that the dew point of hydrogen ($H_2$) supplied to the anode of the MEA became almost equivalent to the temperature of the MEA (that is, such that the relative humidity of hydrogen in the MEA became almost 100%). Then, the MEA was caused to act by causing the current to flow between the anode and the cathode of the MEA.

Subsequently, an exit of the anode of the MEA was sealed, hydrogen supplied to the anode was thereby switched from gas in a wet state to gas in a dry state, and the hydrogen pressurization action was started.

That is, in this experiment, differently from the experiment of FIG. 1, the initial pressure (approximately 2.5 MPa) of the cathode was set to a higher pressure than the gas pressure of the anode before the hydrogen pressurization action was started in the MEA.

Note that the above configuration of the MEA and experiment conditions are examples, and configurations and conditions are not limited to those examples.

FIG. 4 indicates the voltages and the IR losses in the third and sixth hydrogen pressurization actions of the MEA.

As illustrated in FIG. 4, it was found that the voltages and the IR losses in the third and sixth hydrogen pressurization actions of the MEA exhibited generally equivalent tendencies in a cathode gas pressure range of approximately 2.5 MPa to approximately 13 MPa. That is, it was experimentally verified that setting the initial pressure of the cathode to a higher pressure than the gas pressure of the anode before the hydrogen pressurization action was started in the MEA enabled inhibition of rises of the voltage and the IR loss at a start of the hydrogen pressurization action of the MEA.

As described above, the hydrogen supply system 200 and the driving method of the hydrogen supply system 200 of this embodiment adjust the pressure of the electrochemical hydrogen pump 100 before the hydrogen pressurization action is started in the electrochemical hydrogen pump 100 and may thereby appropriately maintain the efficiency of the hydrogen pressurization action of the electrochemical hydrogen pump 100 compared to related art. Specifically, the pressure of the cathode flow path 7 becomes higher than the pressure of the anode flow path 6 before the hydrogen pressurization action is started in the electrochemical hydrogen pump 100. Thus, a state where the electrolyte membrane 1 and the anode catalyst layer 2A are pressed to the anode gas diffusion plate 31 (the anode gas diffusion layer 3A) may be retained at a start of the hydrogen pressurization action of the electrochemical hydrogen pump 100.

This enables lessening in local peeling in an adhering portion between the anode gas diffusion plate 31 and the anode catalyst layer 2A and in an adhering portion between the anode catalyst layer 2A and the electrolyte membrane 1 at a start of the hydrogen pressurization action of the electrochemical hydrogen pump 100. Further, for example, this also enables mitigation of curving of the electrolyte membrane 1 in a protruding shape against the anode gas diffusion plate 31 at a start of the hydrogen pressurization action of the electrochemical hydrogen pump 100. Thus, the hydrogen supply system 200 and the driving method of the hydrogen supply system 200 of this embodiment may inhibit an increase in the contact resistance (electrical resistance) of the electrochemical hydrogen pump 100 compared to related art and may maintain high efficiency of the hydrogen pressurization action of the electrochemical hydrogen pump 100.

Second Embodiment

Figure 5:
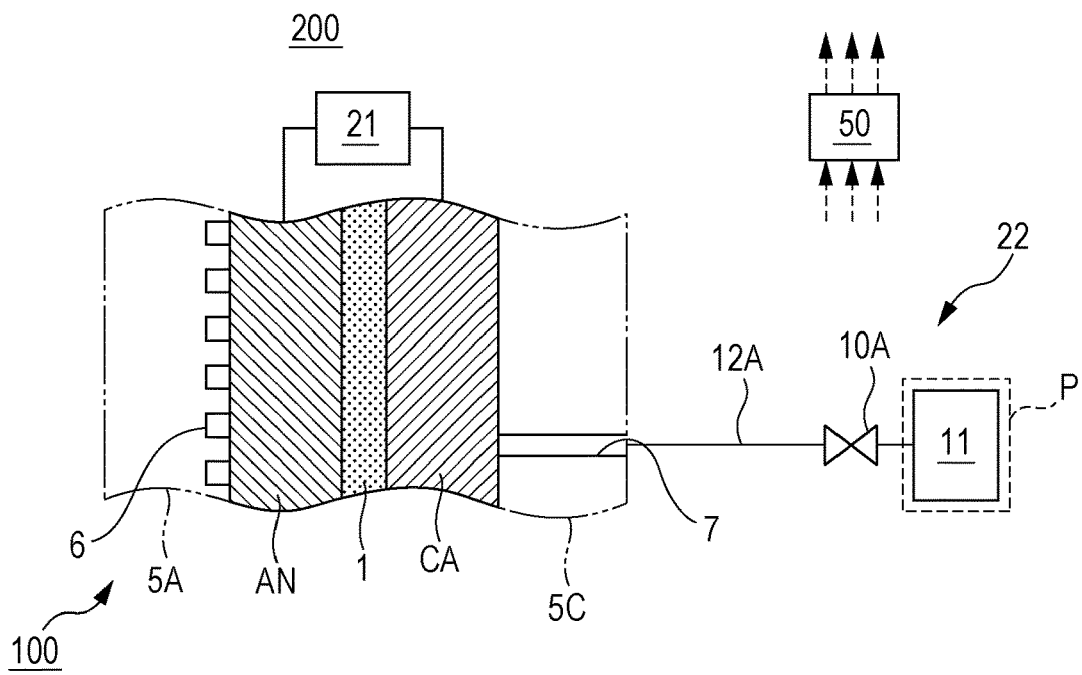
FIG. 5 is a diagram that illustrates one example of a hydrogen supply system of a second embodiment.

FIG. 5 is a diagram that illustrates one example of a hydrogen supply system of a second embodiment.

In the example illustrated in FIG. 5, the hydrogen supply system 200 includes the electrochemical hydrogen pump 100, a first route 12A, the pressure adjuster 22, the controller 50, and a pressure supplier P.

The electrochemical hydrogen pump 100 is similar to the first embodiment, and a description thereof will thus not be made.

In the hydrogen supply system 200 of this embodiment, the pressure adjuster 22 includes a first valve 10A that is provided in the first route 12A which connects the pressure supplier P for supplying a pressure to the cathode flow path 7 with the cathode flow path 7. Here, the pressure supplied to the cathode flow path 7 is higher than the pressure of the anode flow path 6 at a time before the pressure is supplied to the cathode flow path 7.

As the first valve 10A, for example, a solenoid valve may be raised.

Note that the pressure supplier P may include a gas storage apparatus. As the gas storage apparatus, for example, the hydrogen storage apparatus 11 or the like may be used as illustrated in FIG. 5. However, embodiments are not limited to this.

The controller 50 opens the first valve 10A and thereby causes the pressure of the cathode flow path 7 to rise before the hydrogen pressurization action of the electrochemical hydrogen pump 100 is started. Note that in this case, the anode entrance $6_{IN}$ (see FIG. 3A) and the anode exit $6_{OUT}$ (see FIG. 3A) may be opened or may be sealed.

Further, a valve that is provided to a communication route to the cathode CA which is different from the first route 12A (not illustrated; for example, a route which is connected with an exit of the cathode flow path 7 and is different from the first route 12A, a route which is connected with an exit of a different cathode flow path from the cathode flow path 7, or the like) is closed when the pressure of the cathode flow path 7 is caused to rise. A reason for this is because it becomes difficult to apply an appropriate pressure to the cathode flow path 7 in a case where such a valve is opened, hypothetically.

Consequently, the hydrogen supply system 200 of this embodiment opens the first valve 10A provided in the first route 12A before the hydrogen pressurization action is started in the electrochemical hydrogen pump 100 and may thereby provide the pressure in the pressure supplier P to the cathode flow path 7. For example, in a case where the pressure supplier P is a gas storage apparatus, the first valve 10A provided in the first route 12A is opened, and the gas pressure in the gas storage apparatus may thereby be provided to the cathode flow path 7. Accordingly, the state where the electrolyte membrane 1 and the anode catalyst layer 2A are pressed to the anode gas diffusion plate 31 (the anode gas diffusion layer 3A) may be retained at a start of the hydrogen pressurization action of the electrochemical hydrogen pump 100. Thus, an increase in the contact resistance (electrical resistance) of the electrochemical hydrogen pump 100 may be inhibited.

The hydrogen supply system 200 of this embodiment may be similar to the hydrogen supply system 200 of the first embodiment except for the above features.

Practical Example

For realization of a hydrogen-based society in the future, a method has been suggested which generates hydrogen by using renewable energy. For example, it is possible to generate hydrogen by a water electrolysis device by using power generated by a solar photovoltaic device in the daytime or to generate hydrogen by applying sunlight to a photocatalyst. In this case, hydrogen generated by using renewable energy may be stored in the hydrogen storage apparatus 11 by the hydrogen pressurization action of the electrochemical hydrogen pump 100, for example. That is, in the daytime, renewable energy such as sunlight is stored in the hydrogen storage apparatus 11 in a mode of hydrogen accumulation instead of electricity accumulation in an accumulator battery or together with electricity accumulation. Then, in the night time, power generation is performed by a fuel cell, for example, by using hydrogen stored in the hydrogen storage apparatus 11.

In such a manner, construction of a hydrogen system that may reduce dependence on grid power has been discussed.

Here, the inventors have found that in view of construction of such a hydrogen system, using the hydrogen storage apparatus 11 as a gas storage apparatus that supplies the gas pressure to the cathode flow path 7 of the electrochemical hydrogen pump 100 is rational. For example, after hydrogen is stored in the hydrogen storage apparatus 11 by the hydrogen pressurization action of the electrochemical hydrogen pump 100, it is requested to close the first valve 10A that is provided in the first route 12A which connects the hydrogen storage apparatus 11 with the cathode flow path 7. That is, while the hydrogen pressurization action of the electrochemical hydrogen pump 100 is stopped, it is requested to disconnect the communication between the hydrogen storage apparatus 11 and the cathode CA of the electrochemical hydrogen pump 100. A reason for this is because cross leakage of hydrogen gradually occurs from the cathode CA in a high pressure state to the anode AN in a low pressure state through the electrolyte membrane 1 and the pressure of the cathode CA thereby lowers.

In other words, in the hydrogen supply system 200 of this practical example, the gas storage apparatus that supplies the gas pressure to the cathode flow path 7 of the electrochemical hydrogen pump 100 includes the hydrogen storage apparatus 11. Note that as the hydrogen storage apparatus 11, for example, a hydrogen tank, which stores high pressure hydrogen, or the like may be raised.

Consequently, the hydrogen supply system 200 of this practical example opens the first valve 10A provided in the first route 12A before the hydrogen pressurization action is started in the electrochemical hydrogen pump 100 and may thereby provide a hydrogen gas pressure in the hydrogen storage apparatus 11 to the cathode flow path 7.

The hydrogen supply system 200 of this practical example may be similar to the hydrogen supply system 200 of the second embodiment except for the above features.

Third Embodiment

Figure 6:
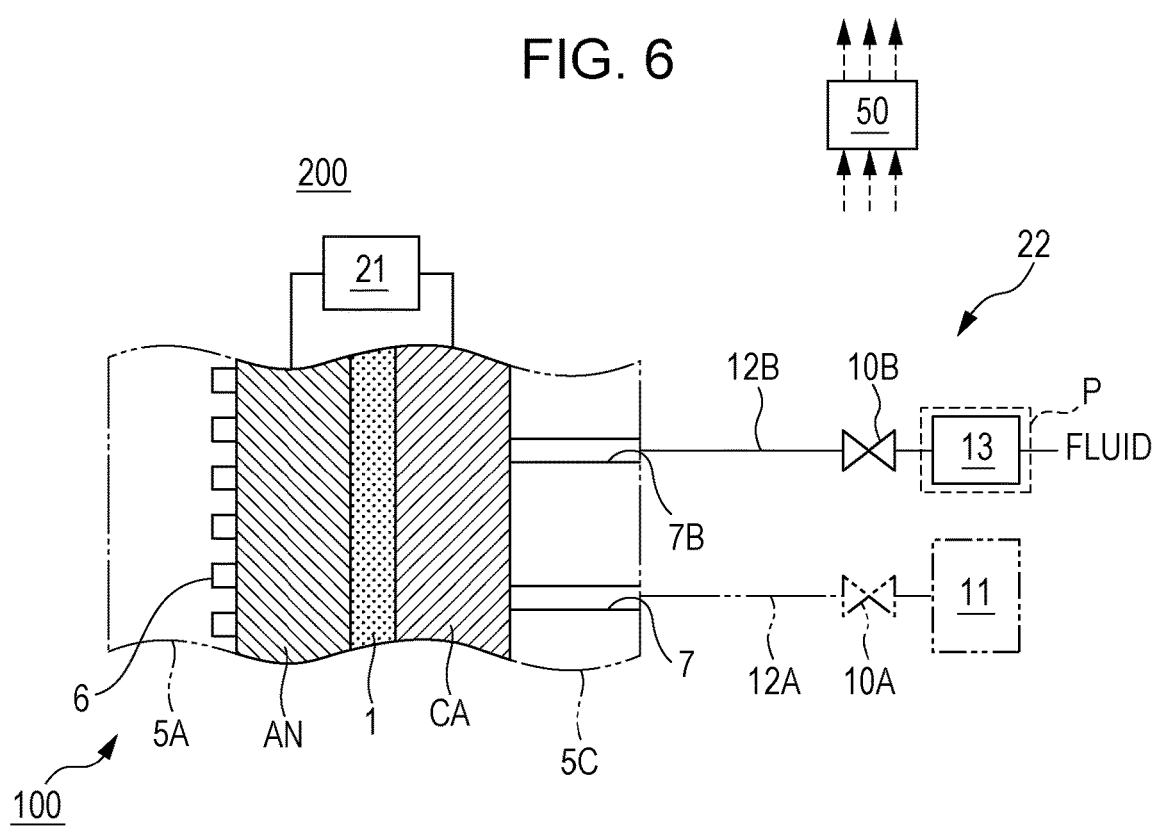
FIG. 6 is a diagram that illustrates one example of a hydrogen supply system of a third embodiment.

FIG. 6 is a diagram that illustrates one example of a hydrogen supply system of a third embodiment.

In the example illustrated in FIG. 6, the hydrogen supply system 200 includes the electrochemical hydrogen pump 100, the pressure adjuster 22, a first route 12B, the controller 50, and the pressure supplier P.

The electrochemical hydrogen pump 100 is similar to the first embodiment, and a description thereof will thus not be made.

In the hydrogen supply system 200 of this embodiment, the pressure adjuster 22 includes a first valve 10B that is provided in the first route 12B which connects the pressure supplier P for supplying a pressure to the cathode flow path 7B with the cathode flow path 7B. That is, a downstream end of the first route 12B is connected with the cathode flow path 7B. As the first valve 10B, for example, a solenoid valve may be raised. The pressure supplied to the cathode flow path 7 is higher than the pressure of the anode flow path 6 at a time before the pressure is supplied to the cathode flow path 7.

Further, as illustrated in FIG. 6, the pressure supplier P may include a fluid supplier 13 that supplies a fluid to the cathode flow path 7B. In this case, the fluid supplier 13 may be an apparatus that adjusts the flow amount of a fluid to be supplied to the cathode flow path 7B. As such an apparatus, for example, a pressurizer such as a pump may be raised. Note that details of the fluid will be described in a practical example and a modification example.

The controller 50 causes the pressure of the cathode flow path 7B to rise by opening the first valve 10B and causing the pressure supplier P (for example, the fluid supplier 13) to act before the hydrogen pressurization action of the electrochemical hydrogen pump 100 is started.

Note that in this case, the anode entrance $6_{IN}$ (see FIG. 3A) and the anode exit $6_{OUT}$ (see FIG. 3A) may be opened or may be sealed. The first valve 10A, which is indicated by two-dot chain lines in FIG. 6, is closed.

However, when at least one of the anode entrance $6_{IN}$ and the anode exit $6_{OUT}$ is opened, the pressure of the anode flow path 6 becomes almost equivalent to the atmospheric pressure. Thus, in this case, the fluid pressure that is produced when the fluid is supplied to the cathode flow path 7B by an action of the fluid supplier 13 is provided to the cathode flow path 7, and it thereby becomes easy to make the pressure of the cathode flow path 7 higher than the pressure of the anode flow path 6. On the other hand, when both of the anode entrance $6_{IN}$ and the anode exit $6_{OUT}$ are closed, cross leakage of hydrogen gradually occurs from the cathode CA in a high pressure state to the anode AN in a low pressure state through the electrolyte membrane, and the pressure of the anode flow path 6 thereby gradually becomes higher. Thus, in this case, the fluid pressure has to be appropriately adjusted such that the pressure of the cathode flow path 7 becomes higher than the pressure of the anode flow path 6.

Consequently, the hydrogen supply system 200 of this embodiment may provide the pressure, which is produced by causing the pressure supplier P to act, to the cathode flow path 7 before the hydrogen pressurization action is started in the electrochemical hydrogen pump 100. For example, in a case where the pressure supplier P is the fluid supplier 13 that supplies the fluid to the cathode flow path 7B, the fluid pressure that is produced when the fluid is supplied to the cathode flow path 7B by the action of the fluid supplier 13 may be provided to the cathode flow path 7. Accordingly, the state where the electrolyte membrane 1 and the anode catalyst layer 2A are pressed to the anode gas diffusion plate 31 (the anode gas diffusion layer 3A) may be retained at a start of the hydrogen pressurization action of the electrochemical hydrogen pump 100. Thus, an increase in the contact resistance (electrical resistance) of the electrochemical hydrogen pump 100 may be inhibited.

The hydrogen supply system 200 of this embodiment may be similar to the hydrogen supply system 200 of any of the first embodiment, the second embodiment, and the practical example of the second embodiment except for the above features.

Practical Example

[Device Configuration]

Figure 7A:
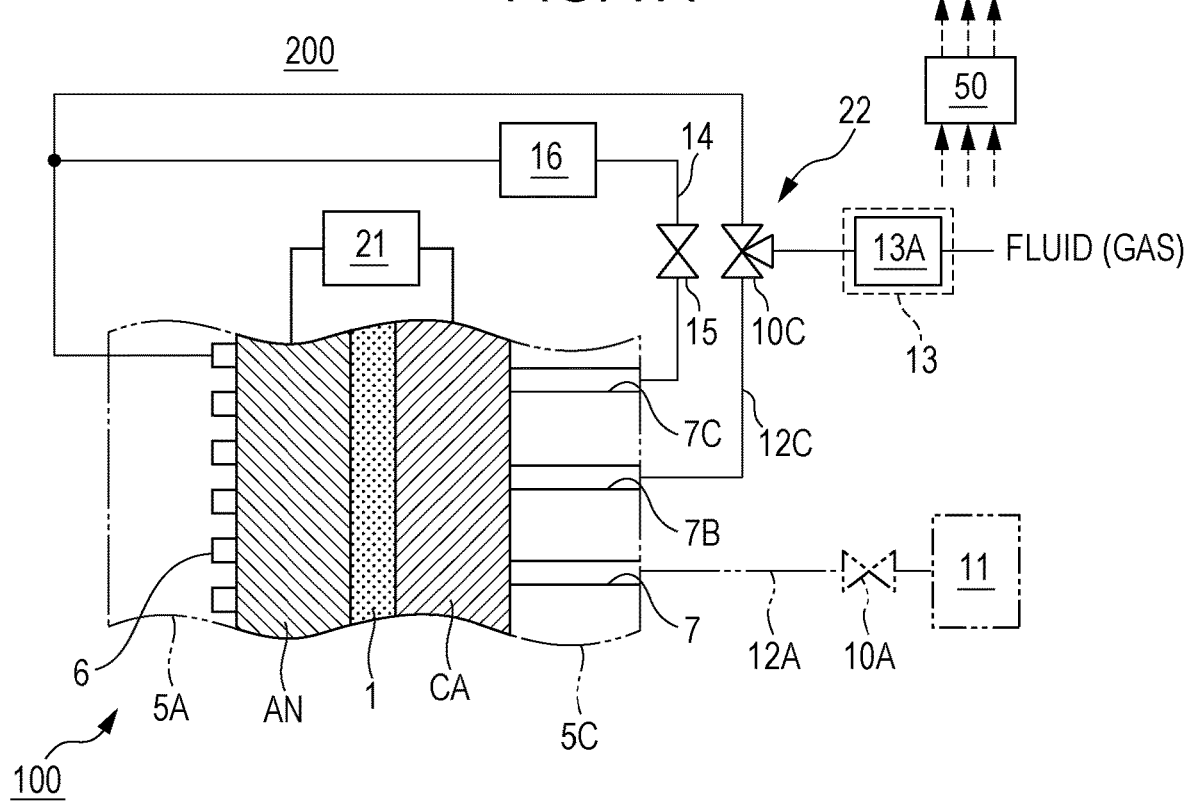
FIG. 7A is a diagram that illustrates one example of a hydrogen supply system of a practical example of the third embodiment.

FIG. 7A is a diagram that illustrates one example of a hydrogen supply system of a practical example of the third embodiment.

In the example illustrated in FIG. 7A, the hydrogen supply system 200 includes the electrochemical hydrogen pump 100, the pressure adjuster 22, the fluid supplier 13, a first route 12C, a second route 14, a second valve 15, a pressure drop unit 16, and the controller 50.

The electrochemical hydrogen pump 100 is similar to the first embodiment, and a description thereof will thus not be made.

The fluid supplier 13 may include a gas supplier 13A that supplies gas to the cathode flow path 7B. In this case, the gas supplier 13A may be an apparatus that adjusts the flow amount of the gas to be supplied to the cathode flow path 7B. As such an apparatus, for example, a pressurizer such as a pump may be raised. Note that as the gas supplied to the cathode flow path 7B, for example, hydrogen gas may be raised.

The hydrogen supply system 200 of this practical example uses gas as the fluid supplied to the cathode flow path 7B. However, embodiments are not limited to this. The fluid supplied to the cathode flow path 7B may be a liquid such as water. Details will be described in a modification example.

The pressure adjuster 22 includes a first valve 10C that is provided in the first route 12C which connects the fluid supplier 13 for supplying a pressure to the cathode flow path 7B with the cathode flow path 7B. Here, the pressure supplied to the cathode flow path 7B is higher than the pressure of the anode flow path 6 at a time before the pressure is supplied to the cathode flow path 7B. As the first valve 10C, for example, a solenoid valve may be raised. As illustrated in FIG. 7A, the first valve 10C is configured with a three-way valve, but such a first valve 10C may be configured by a combination of two-way valves.

Here, the fluid supplier 13 is connected with both of the cathode flow path 7B and the anode flow path 6 via the first valve 10C (three-way valve). Thus, the electrochemical hydrogen pump 100 of this practical example is configured to be capable of selecting either of supplying the fluid passing through the fluid supplier 13 to the cathode flow path 7 or of supplying the fluid to the anode flow path 6 by operating the first valve 10C.

The second route 14 is a flow path through which the fluid (for example, gas) discharged from the cathode flow path 7C flows. Further, the second route 14 is connected with the anode flow path 6. That is, an upstream end of the second route 14 is connected with the cathode flow path 7C, and a downstream end of the second route 14 is connected with the anode flow path 6.

The second valve 15 and the pressure drop unit 16 are provided in the second route 14. As the second valve 15, for example, a solenoid valve may be raised. As the pressure drop unit 16, for example, an orifice provided to piping that configures the second route 14 and so forth may be raised.

The controller 50 opens the second valve 15 in a case where the controller 50 causes the pressure of the cathode flow path 7 to rise by opening the first valve 10C in the direction in which the first route 12C communicates with the fluid supplier 13 and causing the fluid supplier 13 to act before the hydrogen pressurization action of the electrochemical hydrogen pump 100 is started. Note that in this case, the first valve 10A, which is indicated by two-dot chain lines in FIG. 7A, is closed.

[Action]

A driving method of the hydrogen supply system 200 of this practical example will hereinafter be described with reference to the drawings. Note that here, a description will be made about a case where hydrogen gas is used as the fluid supplied to the cathode flow path 7B.

The following action may be performed by a control program from the storage circuit of the controller 50, which is performed by the arithmetic circuit of the controller 50, for example. However, performing the following action by the controller is not necessarily requested. An operator may perform a portion of the action.

Figure 7B:
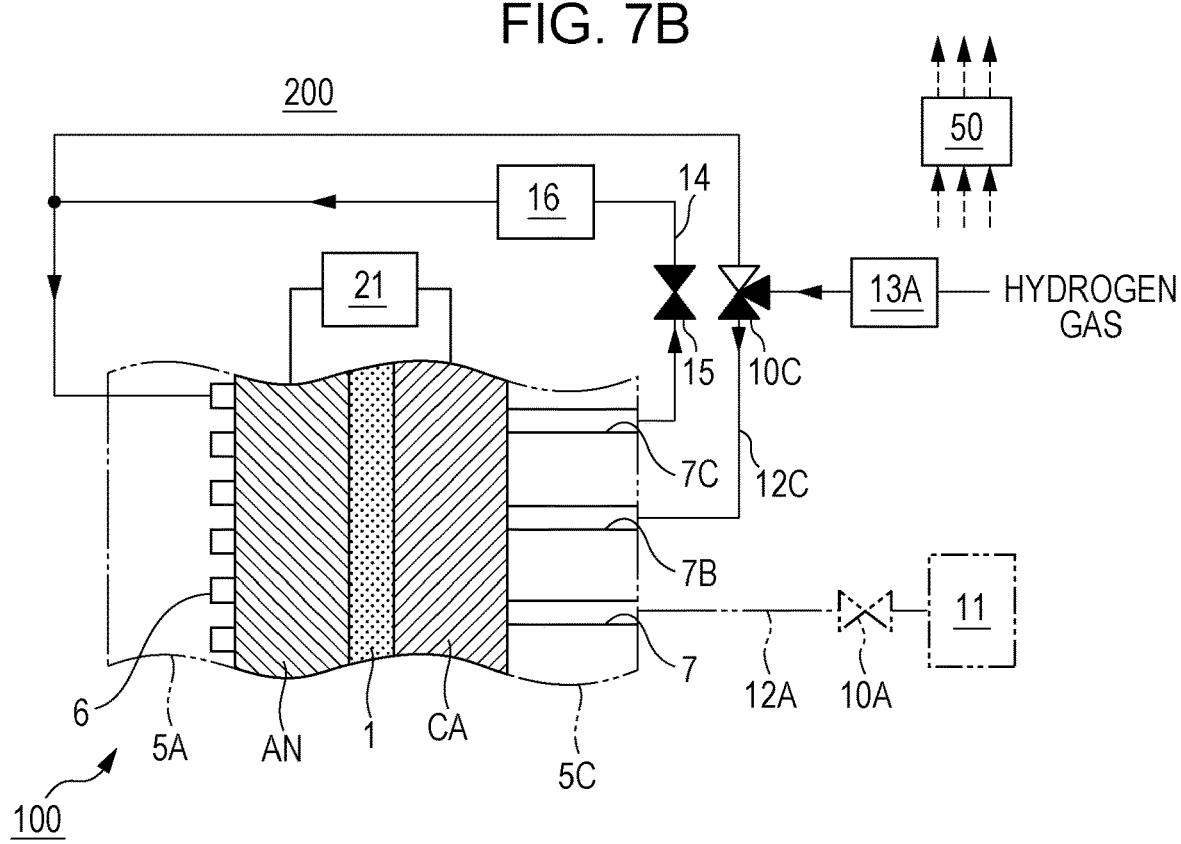
FIG. 7B is a diagram that illustrates one example of a driving method of the hydrogen supply system of the practical example of the third embodiment.
Figure 7C:
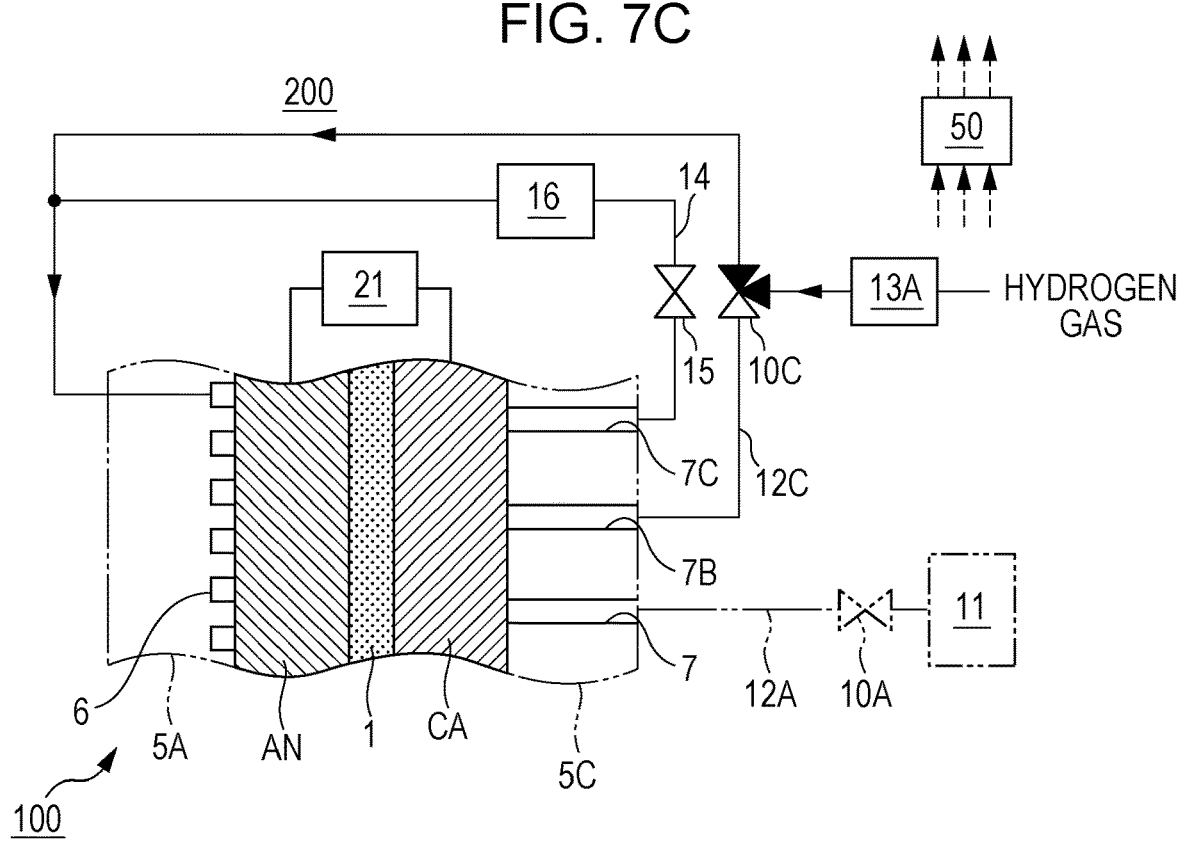
FIG. 7C is a diagram that illustrates one example of the driving method of the hydrogen supply system of the practical example of the third embodiment.

FIG. 7B and FIG. 7C are diagrams that illustrate one example of the driving method of the hydrogen supply system of the practical example of the third embodiment. FIG. 7B illustrates a state where hydrogen gas is supplied to the cathode flow path 7B before the hydrogen pressurization action is started in the electrochemical hydrogen pump 100. FIG. 7C illustrates a state where a transition is made from such a hydrogen gas supply state to stoppage of hydrogen gas supply to the cathode flow path 7B.

Note that in FIG. 7B and FIG. 7C, for easy understanding of the contents of the drawings, the open sides of the first valve 10C are indicated by black, and the closed side is indicated by white for convenience. Further, the second valve 15 in the open state is indicated by black, and the second valve 15 in the closed state is indicated by white. Further, the flow of hydrogen gas is indicated by arrows.

First, as illustrated in FIG. 7B, before the hydrogen pressurization action is started in the electrochemical hydrogen pump 100, hydrogen gas that passes through the gas supplier 13A is supplied to the cathode flow path 7B through the first route 12C by an operation of the first valve 10C and an action of the gas supplier 13A.

In this case, because the second valve 15 is opened, the hydrogen gas that passes through the cathode CA is discharged to the second route 14 through the cathode flow path 7C. Then, hydrogen gas that flows through the second route 14 passes through the pressure drop unit 16 and is thereafter supplied to the anode flow path 6.

Next, as illustrated in FIG. 7C, when the hydrogen pressurization action is started in the electrochemical hydrogen pump 100, the hydrogen gas that passes through the gas supplier 13A is directly supplied to the anode flow path 6, not via the cathode CA, by an operation of the first valve 10C and an action of the gas supplier 13A. Accordingly, hydrogen gas may smoothly be supplied to the anode flow path 6. Note that in this case, the second valve 15 is closed as illustrated in FIG. 7C.

Consequently, the hydrogen supply system 200 of this practical example uses a differential pressure that is produced in the pressure drop unit 16 when hydrogen gas discharged from the cathode flow path 7C is supplied to the anode flow path 6 via the second route 14 and may thereby make the pressure of the cathode flow path 7C higher than the pressure of the anode flow path 6.

Thus, the hydrogen supply system 200 of this practical example may retain the state where the electrolyte membrane 1 and the anode catalyst layer 2A are pressed to the anode gas diffusion plate 31 (the anode gas diffusion layer 3A) by the differential pressure at a start of the hydrogen pressurization action of the electrochemical hydrogen pump 100 and may thus inhibit an increase in the contact resistance (electrical resistance) of the electrochemical hydrogen pump 100.

Note that the hydrogen supply system 200 of this practical example uses the differential pressure produced in the pressure drop unit 16 and thereby makes the pressure of the cathode flow path 7C higher than the pressure of the anode flow path 6. However, embodiments are not limited to this.

For example, without providing a hydrogen discharge route (the second route 14, the second valve 15, and the pressure drop unit 16), the hydrogen supply system 200 of this practical example may provide the fluid pressure, which is produced when the fluid (for example, gas) is supplied to the cathode flow path 7B by the action of the fluid supplier 13, to the cathode flow path 7B and may thereby make the pressure of the cathode flow path 7B higher than the pressure of the anode flow path 6.

The hydrogen supply system 200 of this practical example may be similar to the hydrogen supply system 200 of the third embodiment except for the above features.

Modification Example

The hydrogen supply system 200 of this modification example is similar to the practical example of the third embodiment except that water is used for the fluid supplied to the cathode flow path 7B and the fluid supplier 13 is a water supplier (for example, a pressurizer such as a pump). Thus, a description will not be made about a device configuration and a driving method of the hydrogen supply system 200 of this modification example.

Consequently, a differential pressure, which is produced in the pressure drop unit 16 when water discharged from the cathode flow path 7C is supplied to the anode flow path 6 via the second route 14, is used, and the pressure of the cathode flow path 7C may thereby be made higher than the pressure of the anode flow path 6.

Thus, the hydrogen supply system 200 of this modification example may retain the state where the electrolyte membrane 1 and the anode catalyst layer 2A are pressed to the anode gas diffusion plate 31 (the anode gas diffusion layer 3A) by the differential pressure at a start of the hydrogen pressurization action of the electrochemical hydrogen pump 100 and may thus inhibit an increase in the contact resistance (electrical resistance) of the electrochemical hydrogen pump 100.

Further, in a case where the electrolyte membrane 1 is a polymer electrolyte membrane, for example, the polymer electrolyte membrane exhibits proton conductivity in a wet state. Thus, in this case, the hydrogen supply system 200 of this modification example supplies water to the cathode flow path 7B and may thereby appropriately maintain the polymer electrolyte membrane in a wet state before the hydrogen pressurization action is started in the electrochemical hydrogen pump 100.

The hydrogen supply system 200 of this modification example may be similar to the hydrogen supply system 200 of the third embodiment or the practical example of the third embodiment except for the above features.

Fourth Embodiment

Figure 8A:
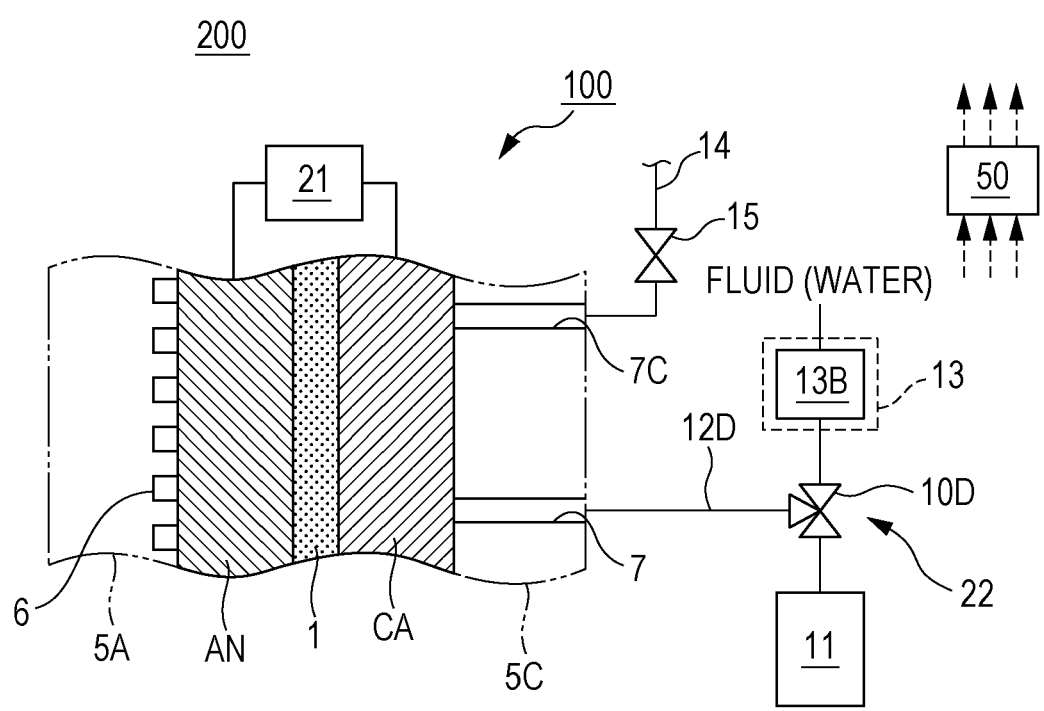
FIG. 8A is a diagram that illustrates one example of a hydrogen supply system of a fourth embodiment.

FIG. 8A is a diagram that illustrates one example of a hydrogen supply system of a fourth embodiment.

In the example illustrated in FIG. 8A, the hydrogen supply system 200 includes the electrochemical hydrogen pump 100, the pressure adjuster 22, the hydrogen storage apparatus 11, the fluid supplier 13, a first route 12D, the second route 14, the second valve 15, and the controller 50.

The electrochemical hydrogen pump 100 and the hydrogen storage apparatus 11 are similar to the first embodiment, and descriptions thereof will thus not be made.

The fluid supplier 13 may include a water supplier 13B that supplies water to the cathode flow path 7. In this case, the water supplier 13B may be an apparatus that adjusts the flow amount of water to be supplied to the cathode flow path 7. As such an apparatus, for example, a pressurizer such as a pump may be raised.

The pressure adjuster 22 includes a first valve 10D that is provided in the first route 12D which connects the fluid supplier 13 for supplying a pressure to the cathode flow path 7 with the cathode flow path 7. As the first valve 10D, for example, a solenoid valve may be raised. As illustrated in FIG. 8A, the first valve 10D is configured with a three-way valve, but such a first valve 10D may be configured by a combination of two-way valves. The pressure supplied to the cathode flow path 7 is higher than the pressure of the anode flow path 6 at a time before the pressure is supplied to the cathode flow path 7.

Here, the cathode flow path 7 is connected with both of the fluid supplier 13 and the hydrogen storage apparatus 11 via the first valve 10D (three-way valve). Thus, the electrochemical hydrogen pump 100 of this embodiment is configured to be capable of selecting either of supplying the fluid passing through the fluid supplier 13 to the cathode flow path 7 or of supplying hydrogen discharged from the cathode flow path 7 to the hydrogen storage apparatus 11 by operating the first valve 10D.

The second route 14 is a flow path through which the fluid (for example, water) discharged from the cathode flow path 7C flows. That is, the upstream end of the second route 14 is connected with the cathode flow path 7C. The second valve 15 is provided in the second route 14. As the second valve 15, for example, a solenoid valve may be raised.

The controller 50 opens the second valve 15 in a case where the controller 50 causes the pressure of the cathode flow path 7 to rise by opening the first valve 10D in the direction in which the first route 12D communicates with the fluid supplier 13 and causing the fluid supplier 13 to act before the hydrogen pressurization action of the electrochemical hydrogen pump 100 is started. Note that in this case, the anode entrance $6_{IN}$ (see FIG. 3A) and the anode exit $6_{OUT}$ (see FIG. 3A) may be opened or may be sealed.

However, when at least one of the anode entrance $6_{IN}$ and the anode exit $6_{OUT}$ is opened, the pressure of the anode flow path 6 becomes almost equivalent to the atmospheric pressure. Thus, in this case, the fluid pressure that is produced when the fluid passes through the cathode CA by an action of the fluid supplier 13 is provided to the cathode flow path 7, and it thereby becomes easy to make the pressure of the cathode flow path 7 higher than the pressure of the anode flow path 6. On the other hand, when both of the anode entrance $6_{IN}$ and the anode exit $6_{OUT}$ are closed, cross leakage of hydrogen gradually occurs from the cathode CA in a high pressure state to the anode AN in a low pressure state through the electrolyte membrane 1, and the pressure of the anode flow path 6 thereby gradually becomes higher. Thus, in this case, the fluid pressure has to be appropriately adjusted such that the pressure of the cathode flow path 7 becomes higher than the pressure of the anode flow path 6.

[Action]

A driving method (action) of the hydrogen supply system 200 of this embodiment will hereinafter be described with reference to the drawings. Note that here, a description will be made about a case where water is used as the fluid supplied to the cathode flow path 7C.

The following action may be performed by a control program from the storage circuit of the controller 50, which is performed by the arithmetic circuit of the controller 50, for example. However, performing the following action by the controller 50 is not necessarily requested. An operator may perform a portion of the action.

Figure 8B:
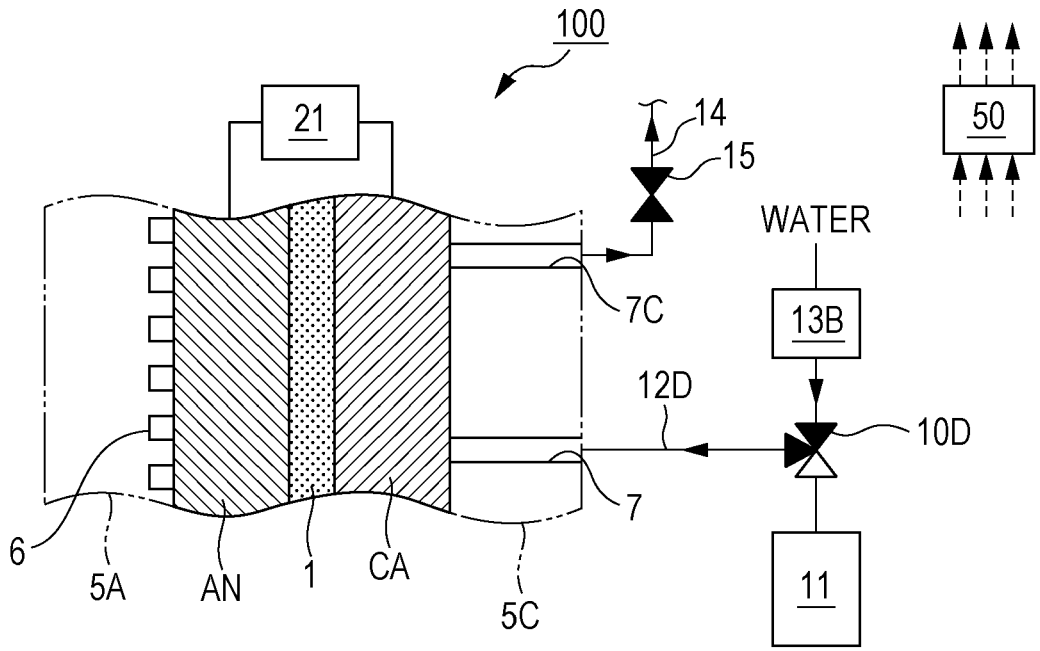
FIG. 8B is a diagram that illustrates one example of a driving method of the hydrogen supply system of the fourth embodiment.
Figure 8C:
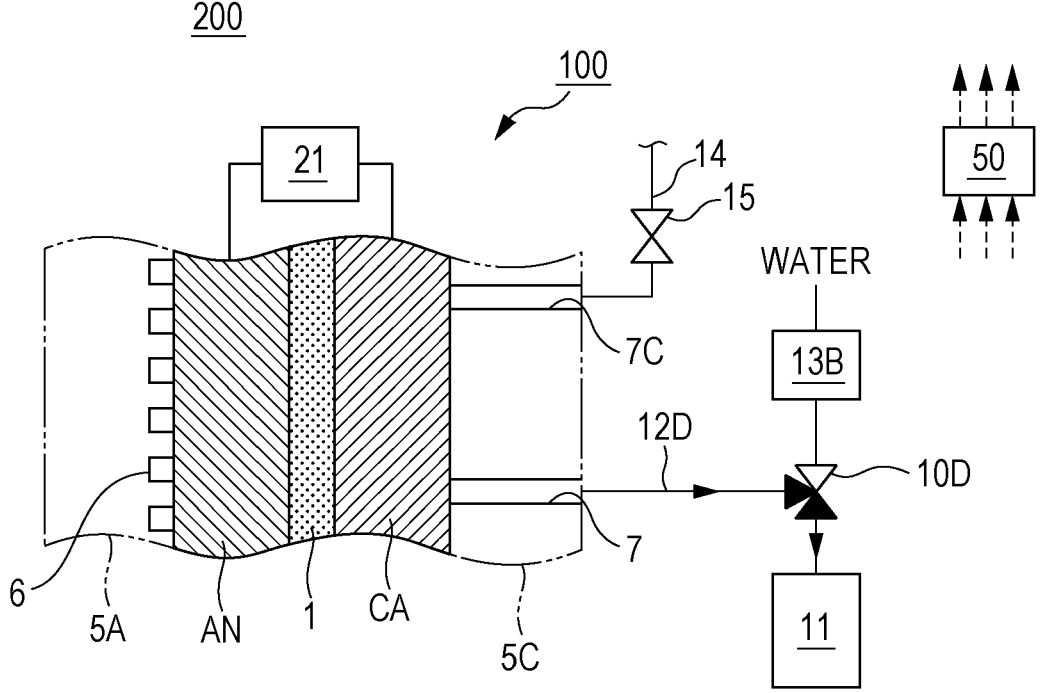
FIG. 8C is a diagram that illustrates one example of the driving method of the hydrogen supply system of the fourth embodiment.

FIG. 8B and FIG. 8C are diagrams that illustrate one example of the driving method of the hydrogen supply system of the fourth embodiment. FIG. 8B illustrates a state where water is supplied to the cathode flow path 7 before the hydrogen pressurization action is started in the electrochemical hydrogen pump 100. FIG. 8C illustrates a state where the hydrogen pressurization action progresses in the electrochemical hydrogen pump 100 and hydrogen of the cathode CA in a high pressure state is supplied to the hydrogen storage apparatus 11.

Note that in FIG. 8B and FIG. 8C, for easy understanding of the contents of the drawings, the open sides of the first valve 10D are indicated by black, and the closed side is indicated by white for convenience. Further, the second valve 15 in the open state is indicated by black, and the second valve 15 in the closed state is indicated by white. Further, the flows of water and hydrogen gas are indicated by arrows.

First, as illustrated in FIG. 8B, before the hydrogen pressurization action is started in the electrochemical hydrogen pump 100, water that passes through the water supplier 13B is supplied to the cathode flow path 7 through the first route 12D by an operation of the first valve 10D and an action of the water supplier 13B.

In this case, because the second valve 15 is opened, the water that passes through the cathode CA is discharged to the outside through the second route 14.

Next, when the hydrogen pressurization action is started in the electrochemical hydrogen pump 100, the action of the water supplier 13B is stopped, and the second valve 15 is closed. Further, for example, a proper on-off valve that is provided in the first route 12D and not illustrated is closed. Then, hydrogen gas is supplied to the anode flow path 6. Accordingly, the hydrogen pressurization action of the electrochemical hydrogen pump 100 is performed.

Next, when the hydrogen pressurization action progresses in the electrochemical hydrogen pump 100, hydrogen of the cathode CA is supplied to the hydrogen storage apparatus 11. In this case, as illustrated in FIG. 8C, the on-off valve is opened, and hydrogen that passes through the cathode flow path 7 is supplied to the hydrogen storage apparatus 11 through the first route 12D by an operation of the first valve 10D.

Consequently, the hydrogen supply system 200 of this embodiment may provide water pressure, which is produced when water passes through the cathode CA by the action of the water supplier 13B, to the cathode flow path 7 before the hydrogen pressurization action is started in the electrochemical hydrogen pump 100. Accordingly, the state where the electrolyte membrane 1 and the anode catalyst layer 2A are pressed to the anode gas diffusion plate 31 (the anode gas diffusion layer 3A) may be retained at a start of the hydrogen pressurization action of the electrochemical hydrogen pump 100. Thus, an increase in the contact resistance (electrical resistance) of the electrochemical hydrogen pump 100 may be inhibited.

Note that the hydrogen supply system 200 of this embodiment provides the water pressure, which is produced when water passes through the cathode CA by an action of the water supplier 13B, to the cathode flow path 7 and thereby makes the pressure of the cathode flow path 7C higher than the pressure of the anode flow path 6. However, embodiments are not limited to this. For example, without providing a water discharge route (the second route 14 and the second valve 15), the hydrogen supply system 200 of this embodiment may provide the water pressure, which is produced when water is supplied to the cathode flow path 7 by the action of the water supplier 13B, to the cathode flow path 7 and may thereby make the pressure of the cathode flow path 7 higher than the pressure of the anode flow path 6. Further, for example, even in a case where the water discharge route (the second route 14 and the second valve 15) is provided, the hydrogen supply system 200 of this embodiment may close the second valve 15 to provide the water pressure, which is produced when water is supplied to the cathode flow path 7 by the action of the water supplier 13B, to the cathode flow path 7 and may thereby make the pressure of the cathode flow path 7 higher than the pressure of the anode flow path 6.

The hydrogen supply system 200 of this embodiment may be similar to the hydrogen supply system 200 of any of the first embodiment, the second embodiment, the practical example of the second embodiment, the third embodiment, the practical example of the third embodiment, and the modification example of the third embodiment except for the above features.

Fifth Embodiment

The hydrogen supply system 200 of this embodiment is similar to the hydrogen supply system 200 of the first embodiment except for the following control contents of the controller 50.

In the hydrogen supply system 200 of this embodiment, the controller 50 may control the pressure adjuster 22 and thereby maintain the pressure of the cathode flow path 7 at a higher pressure than the pressure of the anode flow path 6 when the hydrogen pressurization action is not performed in the electrochemical hydrogen pump 100.

Here, when the hydrogen pressurization action is not performed in the electrochemical hydrogen pump 100, cross leakage of hydrogen gradually occurs from the cathode CA in a high pressure state to the anode AN in a low pressure state through the electrolyte membrane 1, and the pressure of the cathode flow path 7 thereby lowers.

Note that here, in a case where the hydrogen partial pressure of the anode AN is different from the hydrogen partial pressure of the cathode CA, an electrical potential difference occurs in accordance with the following Nernst equation (3). Thus, the electrical potential difference between the anode AN and the cathode CA or the change in the electrical potential difference over time is detected, and the pressure difference between the anode AN and the cathode CA may thereby be known at an appropriate timing even if cross leakage of hydrogen occurs.

$$V=RT/nF \times ln(P_{H2}(CA)/P_{H2}(AN)) \quad (3)$$

In the formula (3), R represents the gas constant. T represents the temperature of the MEA of the electrochemical hydrogen pump 100. F represents the Faraday constant. $P_{H2}(CA)$ represents the hydrogen gas partial pressure of the cathode CA. $P_{H2}(AN)$ represents the hydrogen gas partial pressure of the anode AN.

Further, when such a state continues for a prescribed period, the pressure of the cathode flow path 7 possibly becomes almost equivalent to the pressure of the anode flow path 6 due to cross leakage of hydrogen before the hydrogen pressurization action is started in the electrochemical hydrogen pump 100. Then, when hydrogen is supplied to the anode AN at a start of the hydrogen pressurization action of the electrochemical hydrogen pump 100, the pressure of the anode flow path 6 possibly becomes higher than the pressure of the cathode flow path 7.

However, the hydrogen supply system 200 of this embodiment controls the pressure adjuster 22, thereby maintains the pressure of the cathode flow path 7 at a higher pressure than the anode flow path 6 when the hydrogen pressurization action is not performed in the electrochemical hydrogen pump 100, and may thereby reduce such a possibility.

The hydrogen supply system 200 of this embodiment may be similar to the hydrogen supply system 200 of any of the first embodiment, the second embodiment, the practical example of the second embodiment, the third embodiment, the practical example of the third embodiment, the modification example of the third embodiment, and the fourth embodiment except for the above features.

Sixth Embodiment

The hydrogen supply system 200 of this embodiment is similar to the hydrogen supply system 200 of the first embodiment except for a configuration of the voltage applicator 21 and control contents of the controller 50 in the following.

In the hydrogen supply system 200 of this embodiment, the voltage applicator 21 may also serve as the pressure adjuster 22, and the controller 50 may cause the voltage applicator 21 to apply a voltage between the anode AN and the cathode CA and thereby make the pressure of the cathode CA higher than the pressure of the anode AN before the hydrogen pressurization action of the electrochemical hydrogen pump 100 for supplying pressurized hydrogen to the hydrogen storage apparatus 11 is started.

Note that in this case, hydrogen that remains in the anode AN is pressurized and sent to the cathode CA, and the pressure of the cathode CA is thereby maintained at a higher pressure than the pressure of the anode AN. However, hydrogen may be supplied to the anode AN. Further, the voltage of the voltage applicator 21 at a time before the hydrogen pressurization action is started in the electrochemical hydrogen pump 100 is low compared to the voltage of the voltage applicator 21 in a case where the hydrogen pressurization action is performed in the electrochemical hydrogen pump 100. Note that "the voltage of the former is lower than the voltage of the latter" may be a case where the magnitude of the applied voltage of the former may be made low or a case where the time-integrated voltage may be made low by intermittent voltage application in the former even in a case where the magnitude of the applied voltages of both of the former and the latter are the same, for example.

Consequently, the hydrogen supply system 200 of this embodiment causes the voltage applicator 21 to apply a voltage between the anode AN and the cathode CA and may thereby easily maintain the pressure of the cathode CA at a higher pressure than the pressure of the anode AN before the hydrogen pressurization action is started in the electrochemical hydrogen pump 100. Thus, when the hydrogen pressurization action of the electrochemical hydrogen pump 100 is started, the hydrogen supply system 200 of this embodiment may easily reduce the possibility that the pressure of the anode flow path 6 becomes higher than the pressure of the cathode flow path 7 due to cross leakage of hydrogen when hydrogen is supplied to the anode flow path 6.

Note that similarly to the fifth embodiment, the electrical potential difference between the anode AN and the cathode CA of the electrochemical hydrogen pump 100 or the change in the electrical potential difference over time is detected, and the pressure difference between the anode AN and the cathode CA may thereby be known at an appropriate timing even if cross leakage of hydrogen occurs.

The hydrogen supply system 200 of this embodiment may be similar to the hydrogen supply system 200 of any of the first embodiment, the second embodiment, the practical example of the second embodiment, the third embodiment, the practical example of the third embodiment, the modification example of the third embodiment, the fourth embodiment, and the fifth embodiment except for the above features.

Note that the first embodiment, the second embodiment, the practical example of the second embodiment, the third embodiment, the practical example of the third embodiment, the modification example of the third embodiment, the fourth embodiment, the fifth embodiment, and the sixth embodiment may be combined with each other unless those exclude each other.

Further, from the above descriptions, many improvements and other embodiments of the present disclosure are clear for a person having ordinary skill in the art. Therefore, the above descriptions are to be construed as only examples and are provided for the purpose of teaching proper modes for carrying out the present disclosure to a person having ordinary skill in the art. Details of structures and/or functions may substantially be changed without departing from the spirit of the present disclosure.

One aspect of the present disclosure may be used for a hydrogen supply system and a driving method of a hydrogen supply system in which a pressure of an electrochemical hydrogen pump is adjusted before a hydrogen pressurization action is started in the electrochemical hydrogen pump and efficiency of the hydrogen pressurization action of the electrochemical hydrogen pump may thereby appropriately be maintained compared to related art.

What is claimed is:

1. A hydrogen supply system comprising:
an electrochemical hydrogen pump that includes an electrolyte membrane, an anode which is provided to a first main surface of the electrolyte membrane, an anode flow path which is provided on the anode and through which hydrogen flows, a cathode which is provided to a second main surface of the electrolyte membrane, a cathode flow path which is provided on the cathode and through which hydrogen flows, and a voltage applicator which applies a voltage between the anode and the cathode, pressurizes and sends hydrogen which is supplied to the anode via the anode flow path to the cathode by applying a voltage by the voltage applicator, and supplies the pressurized hydrogen in the cathode flow path to a hydrogen reservoir;
a pressure adjuster that adjusts a pressure of the cathode flow path; and
a controller that controls the pressure adjuster and makes the pressure of the cathode flow path higher than a pressure of the anode flow path before a hydrogen pressurization action, in which hydrogen supplied to the anode flow path is pressurized and supplied to the cathode flow path, is started in order to supply the pressurized hydrogen to the hydrogen reservoir in the electrochemical hydrogen pump.

2. The hydrogen supply system according to claim 1, wherein the controller controls the pressure adjuster and causes the pressure of the cathode flow path to rise before the hydrogen pressurization action is started.

3. The hydrogen supply system according to claim 2, wherein
the pressure adjuster includes a first valve that is provided in a first route which connects a pressure supplier which supplies a pressure to the cathode flow path with the cathode flow path, and
the controller causes the pressure of the cathode flow path to rise by opening the first valve before the hydrogen pressurization action is started.

4. The hydrogen supply system according to claim 3, wherein the pressure supplier includes a gas reservoir.

5. The hydrogen supply system according to claim 4, wherein the gas reservoir includes a hydrogen reservoir.

6. The hydrogen supply system according to claim 2, wherein
the pressure adjuster includes a first valve that is provided in a first route which connects a pressure supplier which supplies a pressure to the cathode flow path with the cathode flow path, and
the controller causes the pressure of the cathode flow path to rise by opening the first valve and causing the pressure supplier to act before the hydrogen pressurization action is started.

7. The hydrogen supply system according to claim 6, wherein the pressure supplier includes a fluid supplier that supplies a fluid to the cathode flow path.

8. The hydrogen supply system according to claim 7, further comprising:
a second route through which a fluid discharged from the cathode flow path flows; and
a second valve that is provided in the second route, wherein
the controller opens the second valve in a case where the controller causes the pressure of the cathode flow path to rise by opening the first valve and causing the fluid supplier to act before the hydrogen pressurization action is started.

9. The hydrogen supply system according to claim 8, wherein the second route is connected with the anode flow path.

10. The hydrogen supply system according to claim 9, wherein a pressure dropper is provided in the second route.

11. The hydrogen supply system according to claim 7, wherein the fluid supplier includes a gas supplier.

12. The hydrogen supply system according to claim 7, wherein the fluid supplier includes a water supplier.

13. The hydrogen supply system according to claim 1, wherein the controller controls the pressure adjuster and maintains the pressure of the cathode flow path at a higher pressure than the anode flow path in a case where the hydrogen pressurization action is not performed.

14. The hydrogen supply system according to claim 1, wherein
the voltage applicator also serves as the pressure adjuster, and
the controller causes the voltage applicator to apply a voltage between the anode and the cathode and makes a pressure of the cathode higher than a pressure of the anode before the hydrogen pressurization action for supplying the pressurized hydrogen to the hydrogen reservoir is started.

15. A driving method of a hydrogen supply system, the driving method comprising:
applying a voltage between an anode and a cathode to pressurize and send hydrogen which is supplied to the anode via an anode flow path to the cathode in an electrochemical hydrogen pump that includes an electrolyte membrane, the anode which is provided to a first main surface of the electrolyte membrane, the anode flow path which is provided on the anode and through which hydrogen flows, the cathode which is provided to a second main surface of the electrolyte membrane, and a cathode flow path which is provided on the cathode and through which hydrogen flows;

supplying the pressurized hydrogen in the cathode flow path to a hydrogen reservoir; and making a pressure of the cathode flow path higher than a pressure of the anode flow path before execution of the applying of the voltage.

16. A hydrogen supply system comprising:

an electrolyte membrane;

an anode that is provided to a first main surface of the electrolyte membrane;

an anode flow path which is provided on the anode and through which hydrogen flows;

a cathode that is provided to a second main surface of the electrolyte membrane;

a cathode flow path which is provided on the cathode and through which hydrogen flows;

a voltage applicator that applies a voltage between the anode and the cathode; and a controller that controls the voltage applicator and makes a pressure of the cathode flow path higher than a pressure of the anode flow path before hydrogen supply to the anode flow path is started.

* * * * *